(12) United States Patent
Wada

(10) Patent No.: US 10,031,323 B2
(45) Date of Patent: Jul. 24, 2018

(54) ZOOM LENS AND IMAGE PICKUP APPARATUS INCLUDING THE SAME

(71) Applicant: CANON KABUSHIKI KAISHA, Tokyo (JP)

(72) Inventor: Ken Wada, Sakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/837,758

(22) Filed: Aug. 27, 2015

(65) Prior Publication Data

US 2016/0062091 A1 Mar. 3, 2016

(30) Foreign Application Priority Data

Sep. 2, 2014 (JP) ................................. 2014-177852

(51) Int. Cl.
*G02B 15/14* (2006.01)
*G02B 15/173* (2006.01)
(Continued)

(52) U.S. Cl.
CPC ......... *G02B 15/173* (2013.01); *G02B 15/177* (2013.01); *G02B 15/28* (2013.01)

(58) Field of Classification Search
CPC .... G02B 15/173; G02B 13/009; G02B 13/02; G02B 15/163; G02B 13/0045; G02B 9/60; G02B 15/20; G02B 3/14; G02B 5/005; G02B 13/04; G02B 13/001; G02B 15/24; G02B 23/2438
(Continued)

(56) References Cited

U.S. PATENT DOCUMENTS 5,691,851 A 11/1997 Nishio et al.
8,107,171 B2 1/2012 Nanba
(Continued)

FOREIGN PATENT DOCUMENTS

JP H01154014 A 6/1989
JP H075362 A 1/1995
(Continued)

OTHER PUBLICATIONS

Japanese Office Action dated May 15, 2018 in corresponding Japanese Patent Application No. 2014-177852 with English translation, 11 pages.

*Primary Examiner* — Ricky Mack
*Assistant Examiner* — Daniele Manikeu
(74) *Attorney, Agent, or Firm* — Carter, DeLuca, Farrell & Schmidt LLP

(57) ABSTRACT

Provided is a compact zoom lens having a high aperture ratio and high optical performance over an entire zoom range. The zoom lens includes, in order from object side to image side: first, second, and third lens units respectively having positive, negative, and positive refractive powers; an aperture stop; a middle lens group; and a final lens unit. An interval between adjacent lens units is changed during zooming. The third lens unit includes at least two positive lenses and at least one negative lens. A combined focal length (f12t) of first lens unit and second lens unit at telephoto end, a focal length (fn) of a lens unit (N) having a largest absolute value of the negative refractive power of the lens unit forming middle lens group, a focal length (f3) of third lens unit, and a focal length (ft) of zoom lens at telephoto end are appropriately set.

10 Claims, 11 Drawing Sheets

(51) Int. Cl.
*G02B 15/177* (2006.01)
*G02B 15/28* (2006.01)

(58) Field of Classification Search
USPC .............................. 359/766, 676, 666, 773
See application file for complete search history.

(56) References Cited

U.S. PATENT DOCUMENTS

| | | | |
|---|---|---|---|
| 8,189,074 B2 | 5/2012 | Miyazaki et al. | |
| 8,537,471 B2 | 9/2013 | Uchida et al. | |
| 2009/0244720 A1* | 10/2009 | Yamaguchi | G02B 15/14 359/690 |
| 2010/0302640 A1* | 12/2010 | Take | G02B 15/173 359/557 |
| 2011/0122506 A1* | 5/2011 | Ito | G02B 15/173 359/683 |
| 2011/0228407 A1* | 9/2011 | Yamaguchi | G02B 15/173 359/687 |
| 2011/0286105 A1* | 11/2011 | Yamanaka | G02B 15/173 359/683 |
| 2012/0105708 A1* | 5/2012 | Hagiwara | G02B 15/173 348/345 |
| 2012/0307367 A1* | 12/2012 | Bito | G02B 13/18 359/557 |
| 2014/0118839 A1* | 5/2014 | Sugita | G02B 15/173 359/683 |

FOREIGN PATENT DOCUMENTS

| | | |
|---|---|---|
| JP | 2012047814 A | 3/2012 |
| JP | 2014145960 A | 8/2014 |
| JP | 2015138050 A | 7/2015 |

\* cited by examiner

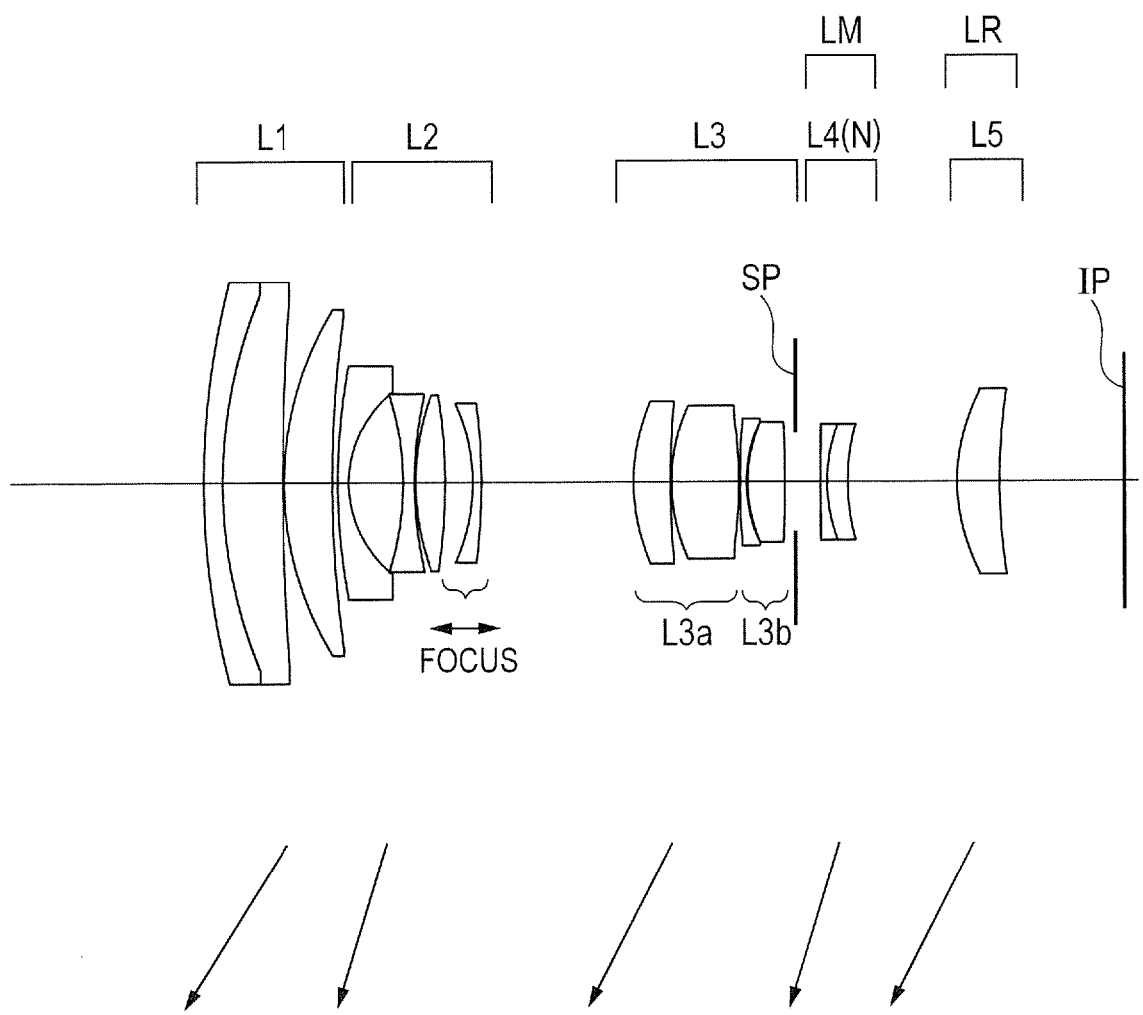

ZOOM LENS AND IMAGE PICKUP APPARATUS INCLUDING THE SAME

BACKGROUND OF THE INVENTION

Field of the Invention

The present invention relates to a zoom lens and an image pickup apparatus including the zoom lens, which are suitably used for an electronic camera such as a video camera or a digital still camera, a film camera, a broadcasting camera, or the like.

Description of the Related Art

For image pickup apparatus in recent years, a compact zoom lens having a high aperture ratio and high optical performance is required. In order to obtain the compact zoom lens, a diameter of a lens barrel needs to be reduced, and there is a need to appropriately set a position of a stop unit in an optical axis direction so that a stop diameter of an aperture stop is reduced.

In order to reduce the stop diameter of the aperture stop while obtaining the high aperture ratio, it is preferred to arrange the aperture stop on an image side of an optical system.

In U.S. Pat. No. 8,189,074, there is disclosed a zoom lens including a first lens unit having a positive refractive power, a second lens unit having a negative refractive power, a third lens unit having a negative refractive power, a lens unit 4A having a positive refractive power, an aperture stop, and a lens unit 4B having a positive refractive power.

According to U.S. Pat. No. 5,691,851, in a zoom lens including, in order from an object side to an image side, a first lens unit to a sixth lens unit having positive, negative, positive, negative, positive, and negative refractive powers, an aperture stop is arranged between the third lens unit and the fourth lens unit.

According to U.S. Pat. No. 8,107,171, in a zoom lens including, in order from an object side to an image side, five lens units having positive, negative, positive, negative, and positive refractive powers, an aperture stop is arranged in the third lens unit.

According to U.S. Pat. No. 8,537,471, in a zoom lens including, in order from an object side to an image side, a first lens unit to a sixth lens unit having positive, negative, positive, positive, negative, and positive refractive powers, an aperture stop is arranged on the image side of the third lens unit or on the image side of the fourth lens unit.

SUMMARY OF THE INVENTION

According to one embodiment of the present invention, there is provided a zoom lens, including, in order from an object side to an image side:

a first lens unit having a positive refractive power;

a second lens unit having a negative refractive power;

a third lens unit having a positive refractive power;

an aperture stop;

a middle lens group including at least one lens unit having a negative refractive power; and a final lens unit having a positive refractive power, in which an interval between adjacent lens units is changed during zooming, in which the third lens unit includes at least two positive lenses and at least one negative lens, and in which the following conditional expressions are satisfied:

$$1.50 < |f12t|/f3 < 2.20; \text{ and}$$

$$0.28 < |fn|/ft < 0.59,$$

where f12t represents a combined focal length of the first lens unit and the second lens unit at a telephoto end, fn represents a focal length of a lens unit (N) having a largest absolute value of the negative refractive power of the at least one lens unit forming the middle lens group, f3 represents a focal length of the third lens unit, and ft represents a focal length of the zoom lens at the telephoto end.

Further features of the present invention will become apparent from the following description of exemplary embodiments with reference to the attached drawings.

BRIEF DESCRIPTION OF THE DRAWINGS

FIG. 3 is a lens cross-sectional view of a zoom lens of Example 2 of the present invention.

DESCRIPTION OF THE EMBODIMENTS

Preferred embodiments of the present invention will now be described in detail in accordance with the accompanying drawings.

Now, a zoom lens according to each of Examples of the present invention and an image pickup apparatus including the zoom lens are described. The zoom lens according to the present invention includes, in order from an object side to an image side, a first lens unit having a positive refractive power, a second lens unit having a negative refractive power, a third lens unit having a positive refractive power, an aperture stop, a middle lens group including at least one lens unit having a negative refractive power, and a final lens unit having a positive refractive power. During zooming, an interval between adjacent lens units is changed. The term "refractive power" as used herein refers to an optical power, and is a reciprocal of a focal length.

Figure 1:
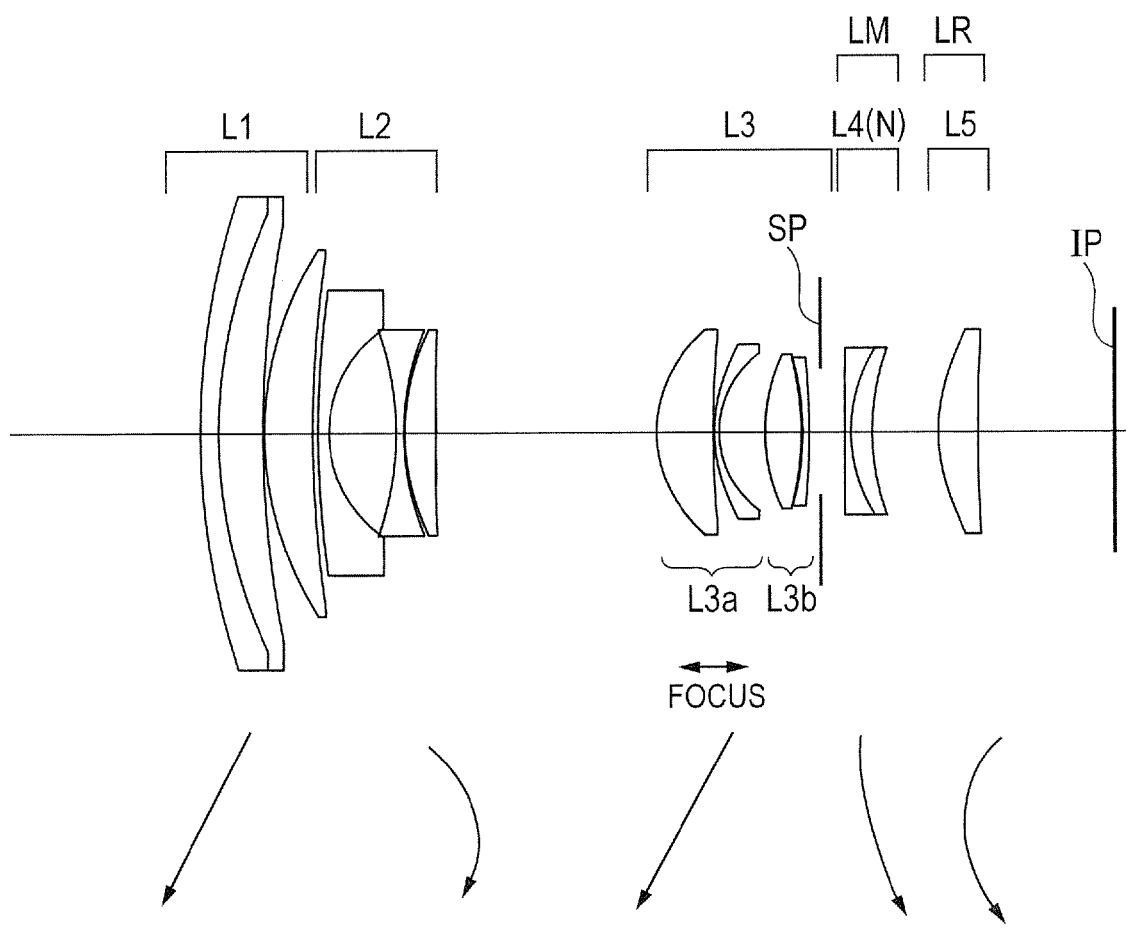
FIG. 1 is a lens cross-sectional view of a zoom lens of Example 1 of the present invention.
Figure 2A:
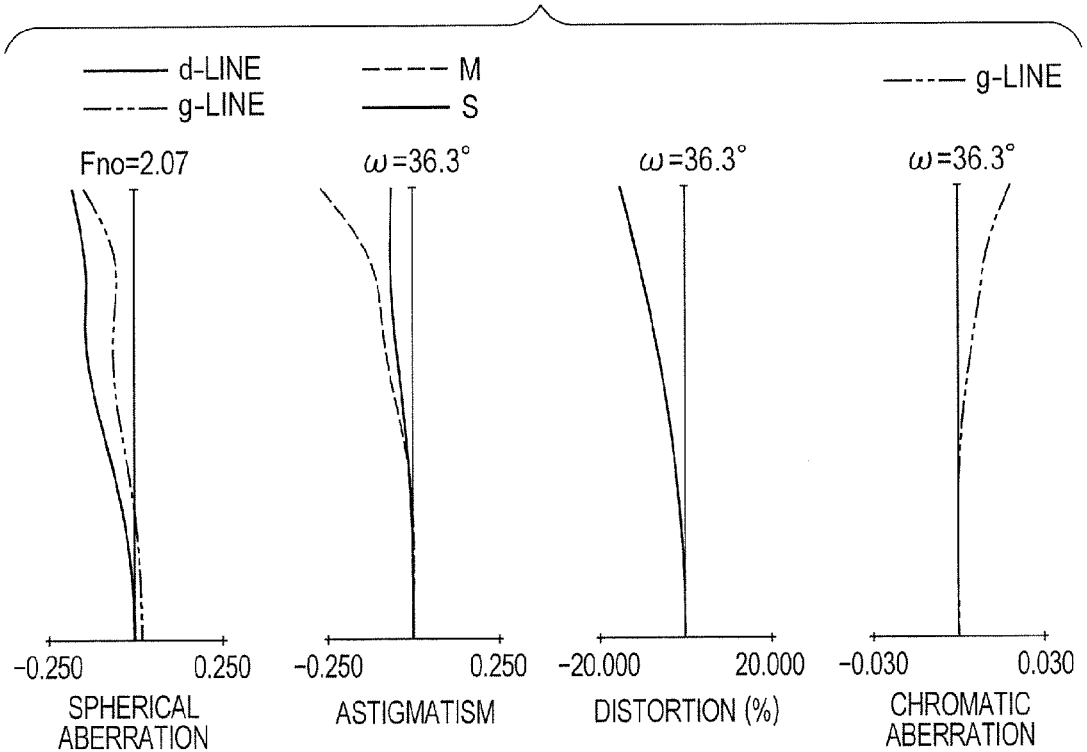
FIG. 2A is an aberration diagram at a wide angle end of the zoom lens of Example 1 of the present invention.
Figure 2B:
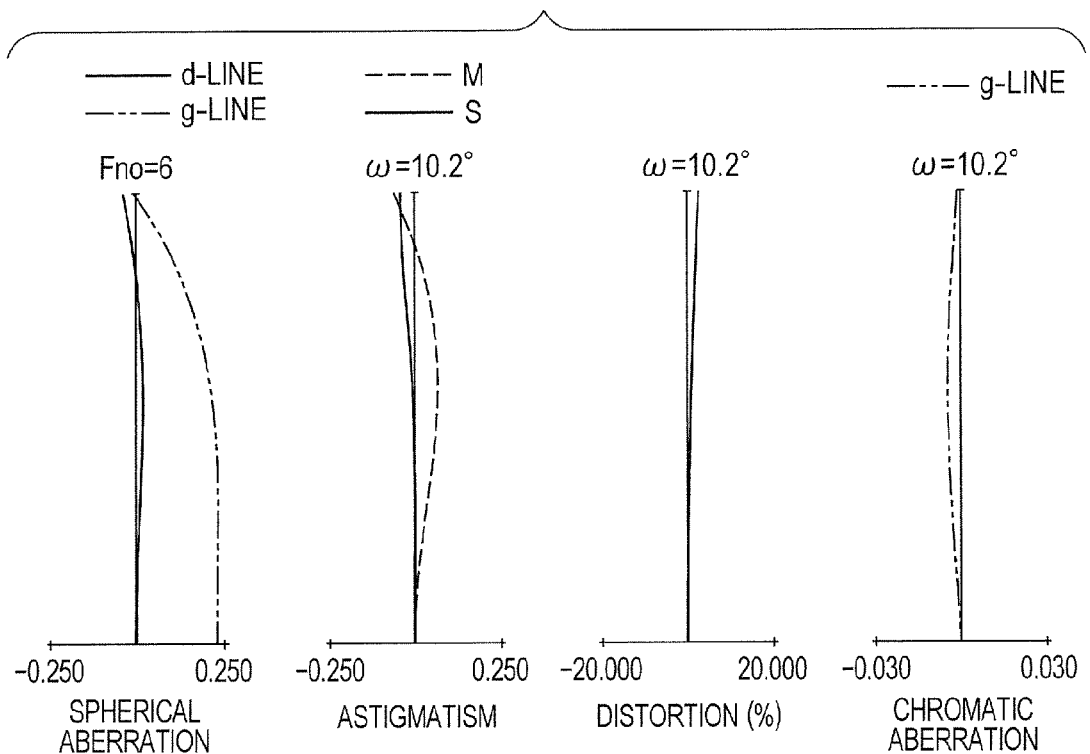
FIG. 2B is an aberration diagram at a telephoto end of the zoom lens of Example 1 of the present invention.
Figure 4A:
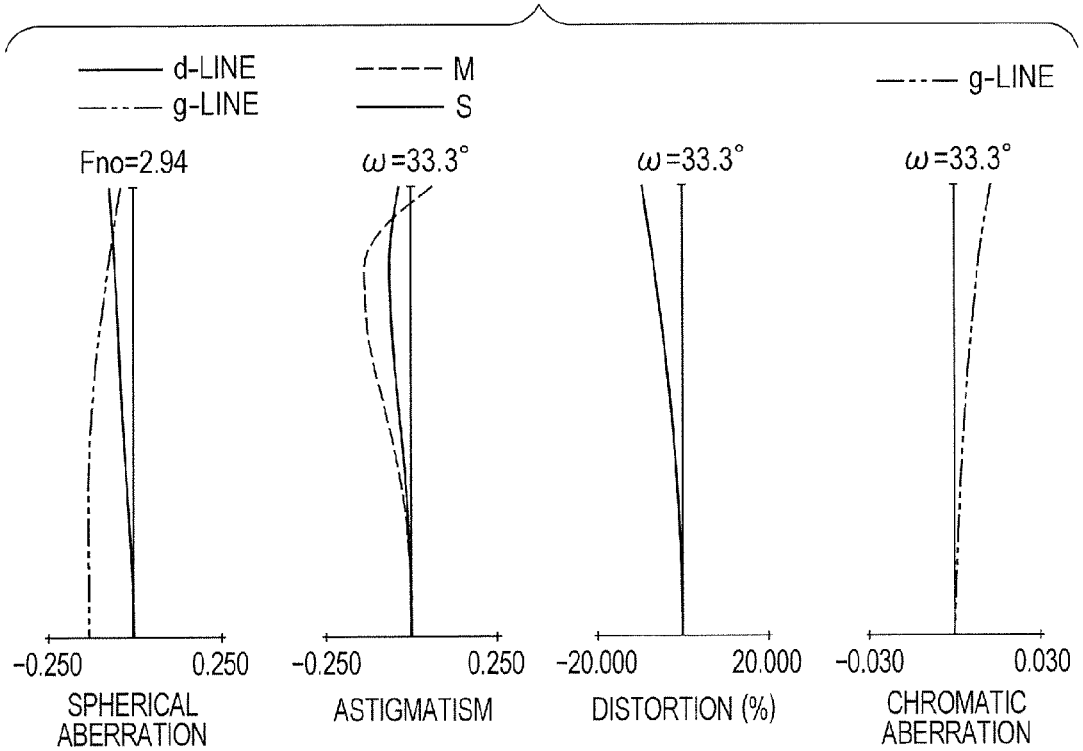
FIG. 4A is an aberration diagram at a wide angle end of the zoom lens of Example 2 of the present invention.
Figure 4B:
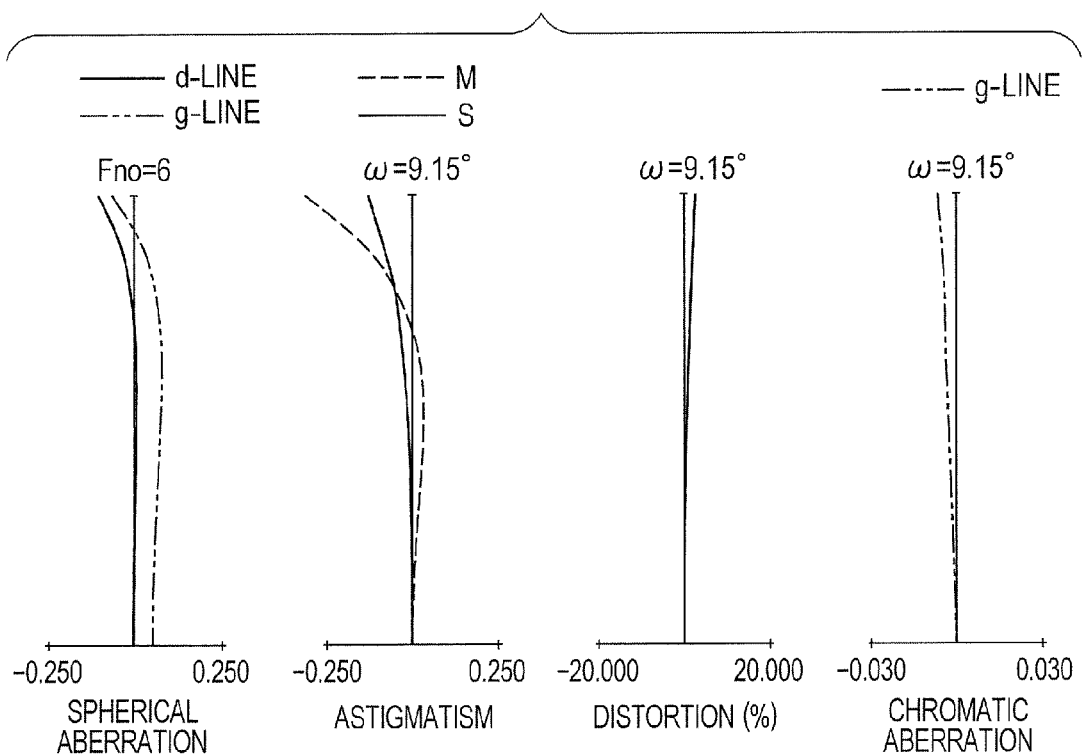
FIG. 4B is an aberration diagram at a telephoto end of the zoom lens of Example 2 of the present invention.

FIG. 1 is a lens cross-sectional view when focusing is made on an object at infinity at a wide angle end (short focal length end) of a zoom lens of Example 1 of the present invention. FIG. 2A and FIG. 2B are longitudinal aberration diagrams when focusing is made on the object at infinity at the wide angle end and a telephoto end (long focal length end) of the zoom lens of Example 1, respectively. FIG. 3 is a lens cross-sectional view when focusing is made on an object at infinity at a wide angle end of a zoom lens of Example 2 of the present invention. FIG. 4A and FIG. 4B are longitudinal aberration diagrams when focusing is made on an object at infinity at the wide angle end and a telephoto end of the zoom lens of Example 2, respectively.

Figure 5:
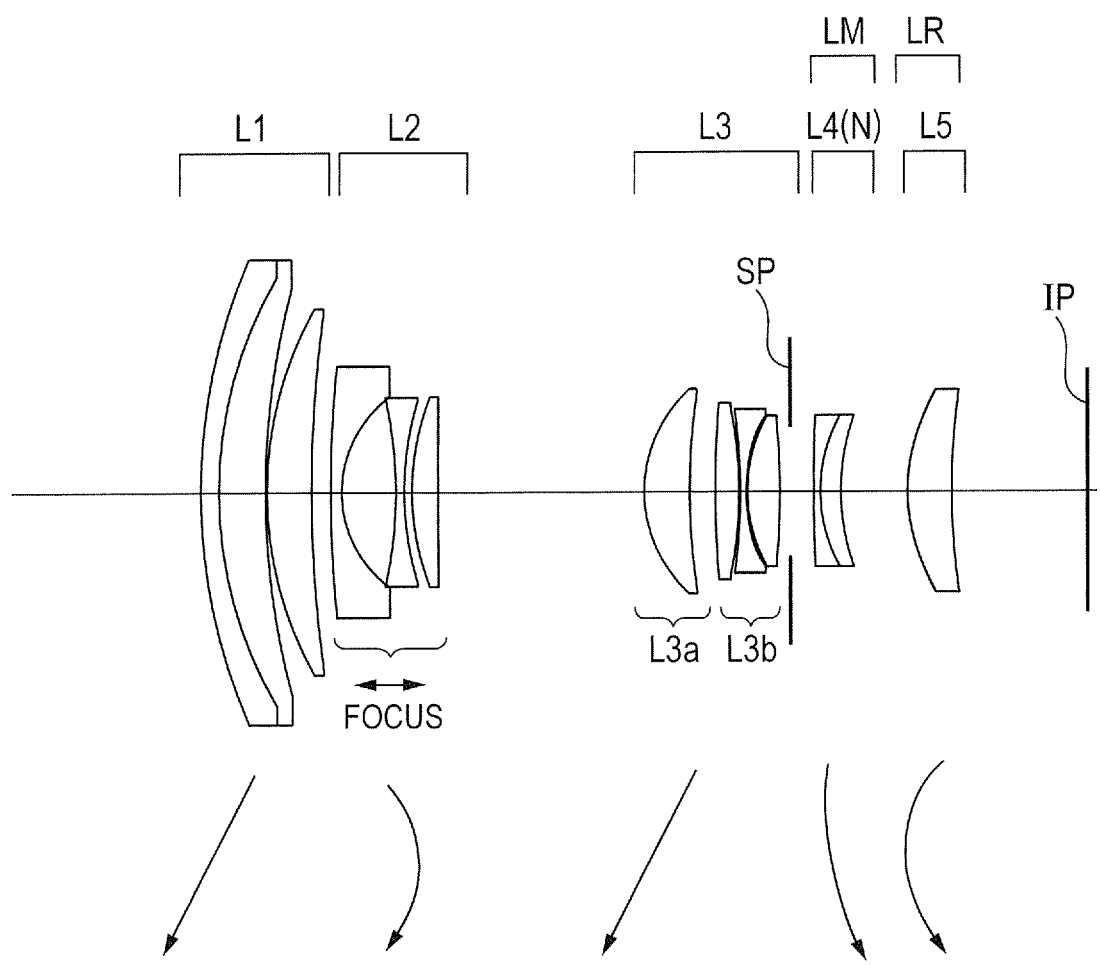
FIG. 5 is a lens cross-sectional view of a zoom lens of Example 3 of the present invention.
Figure 6A:
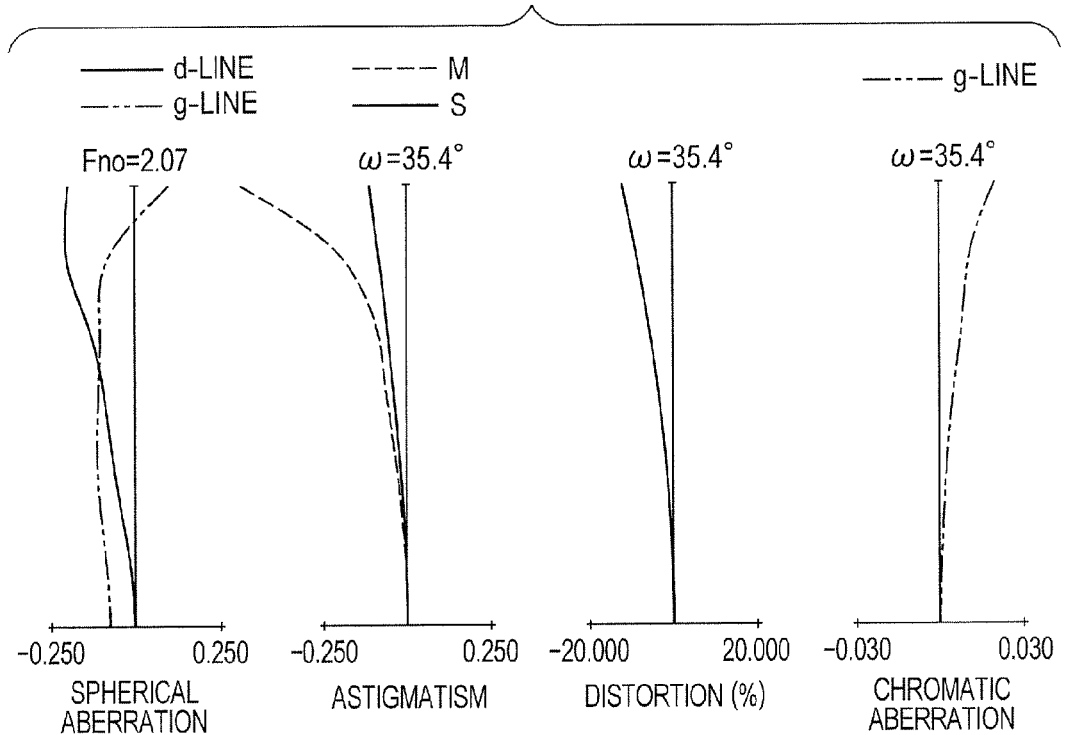
FIG. 6A is an aberration diagram at a wide angle end of the zoom lens of Example 3 of the present invention.
Figure 6B:
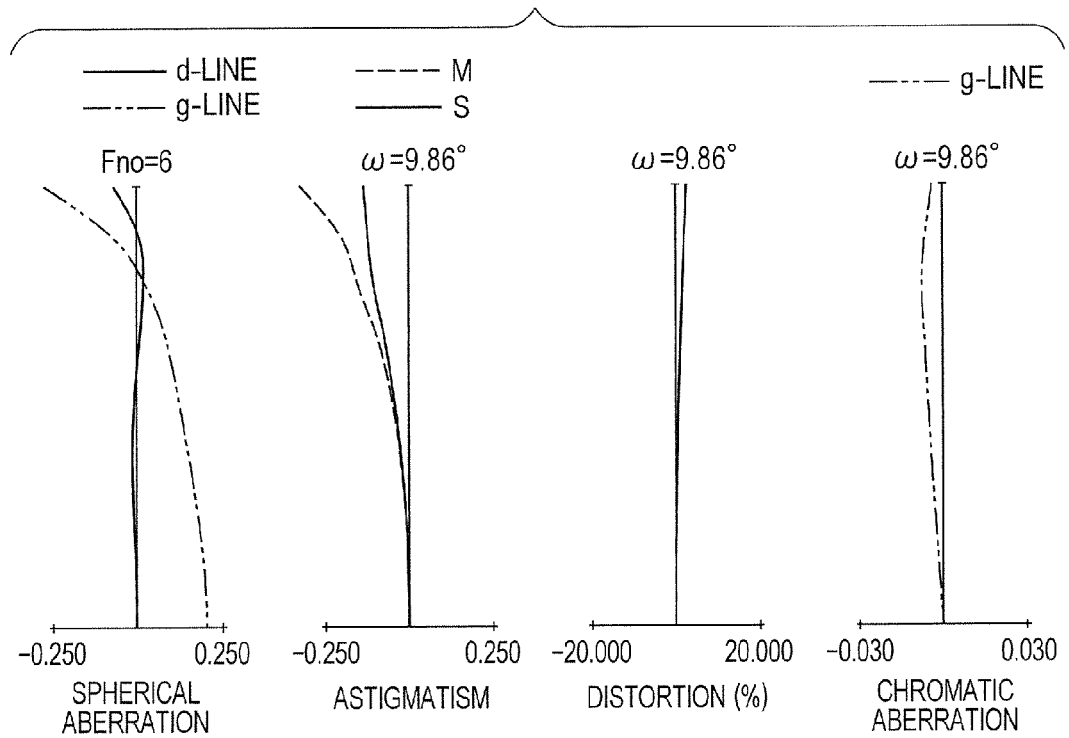
FIG. 6B is an aberration diagram at a telephoto end of the zoom lens of Example 3 of the present invention.
Figure 7:
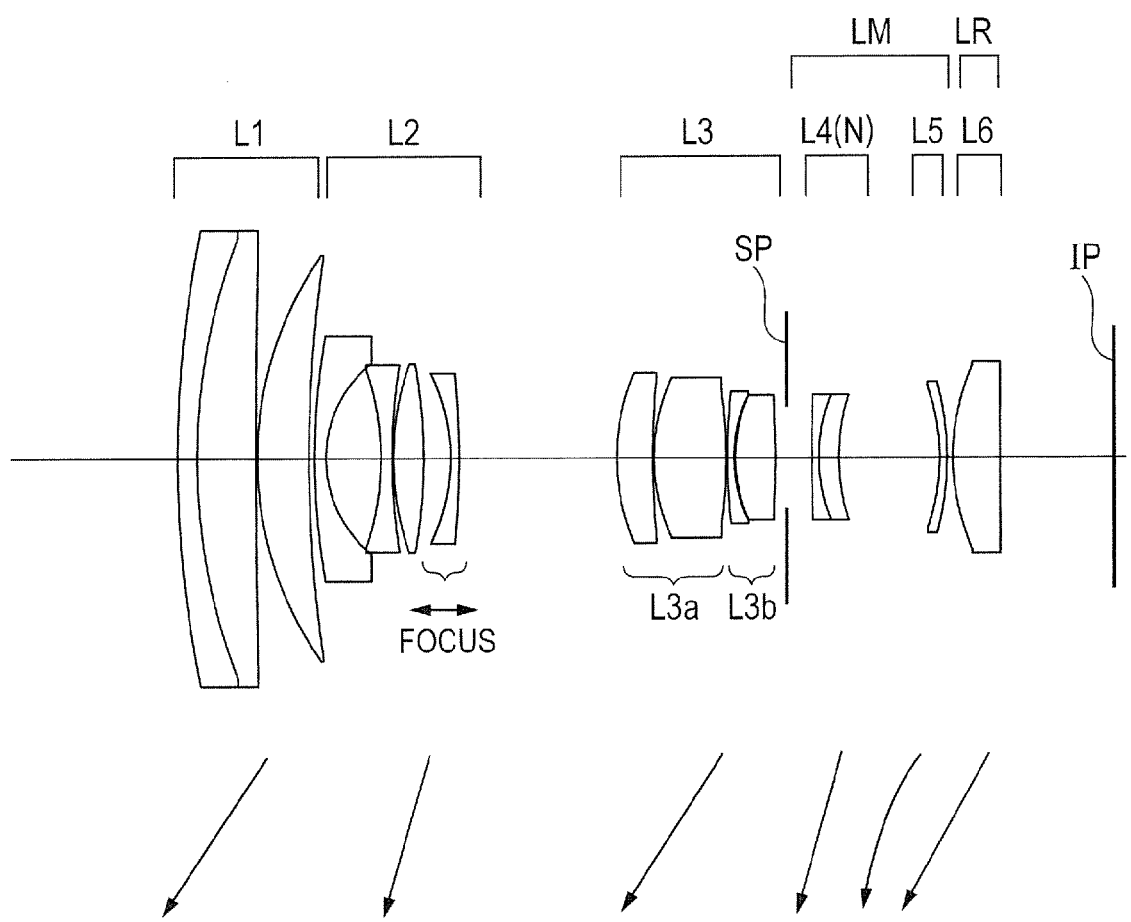
FIG. 7 is a lens cross-sectional view of a zoom lens of Example 4 of the present invention.
Figure 8A:
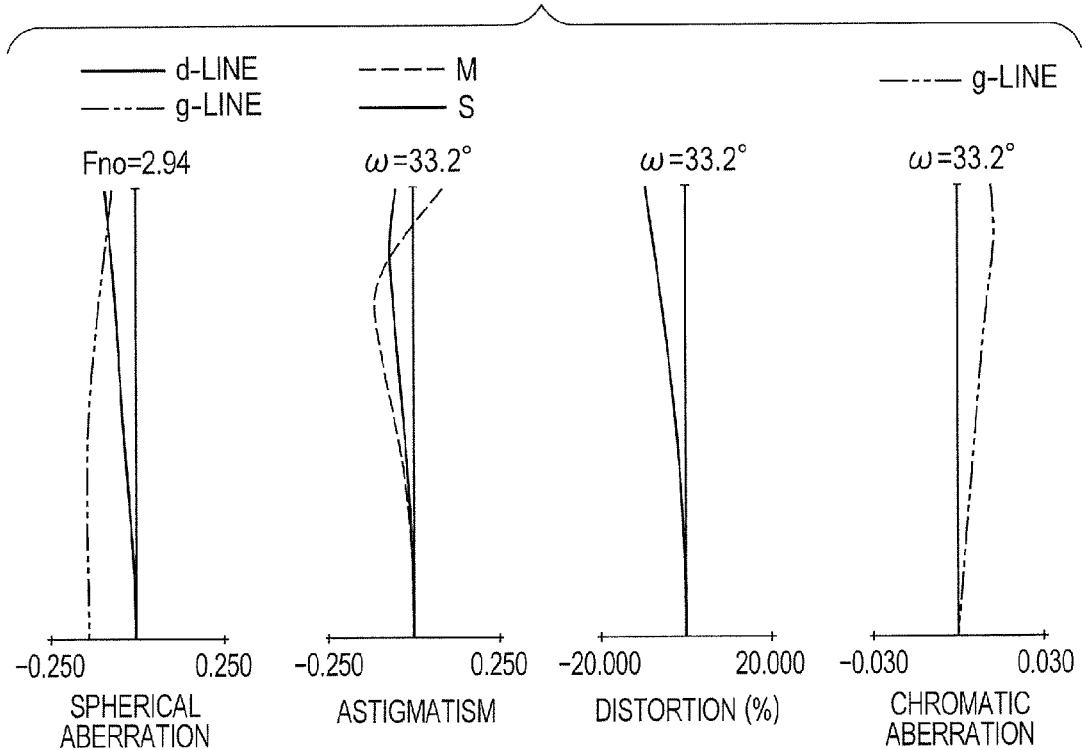
FIG. 8A is an aberration diagram at a wide angle end of the zoom lens of Example 4 of the present invention.
Figure 8B:
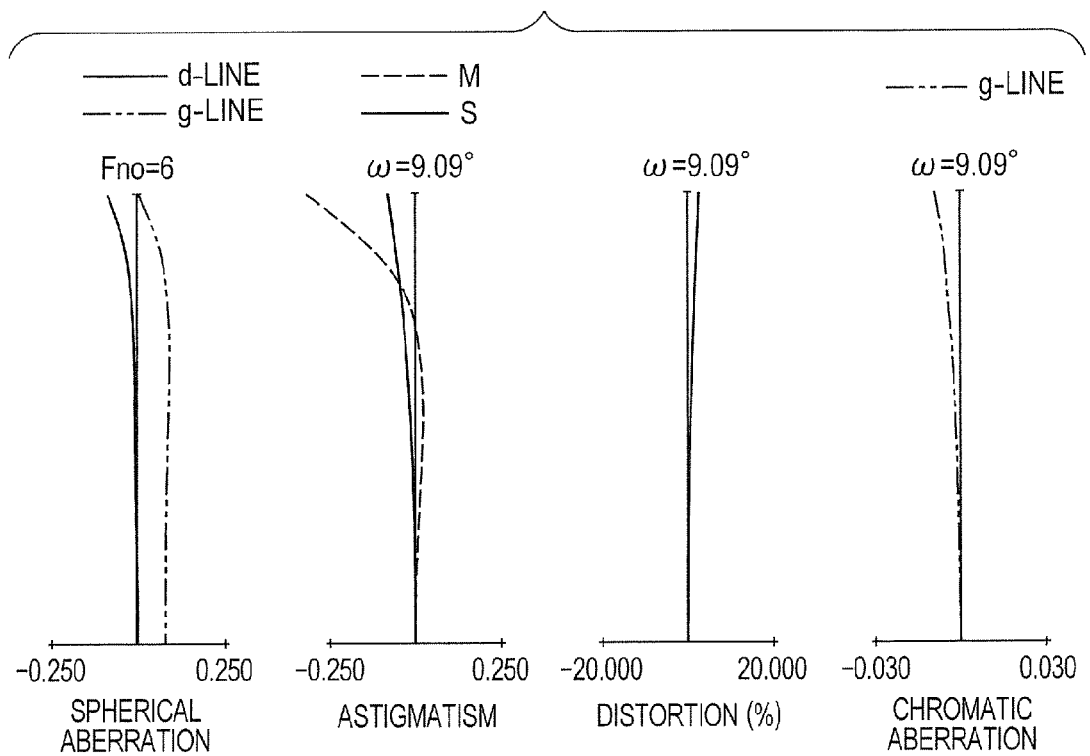
FIG. 8B is an aberration diagram at a telephoto end of the zoom lens of Example 4 of the present invention.

FIG. 5 is a lens cross-sectional view when focusing is made on an object at infinity at a wide angle end of a zoom lens of Example 3 of the present invention. FIG. 6A and FIG. 6B are longitudinal aberration diagrams when the focusing is made on the object at infinity at the wide angle end and a telephoto end of the zoom lens of Example 3, respectively. FIG. 7 is a lens cross-sectional view when focusing is made on an object at infinity at a wide angle end of a zoom lens of Example 4 of the present invention. FIG. 8A and FIG. 83 are longitudinal aberration diagrams when focusing is made on an object at infinity at the wide angle end and a telephoto end of the zoom lens of Example 4, respectively.

Figure 9:
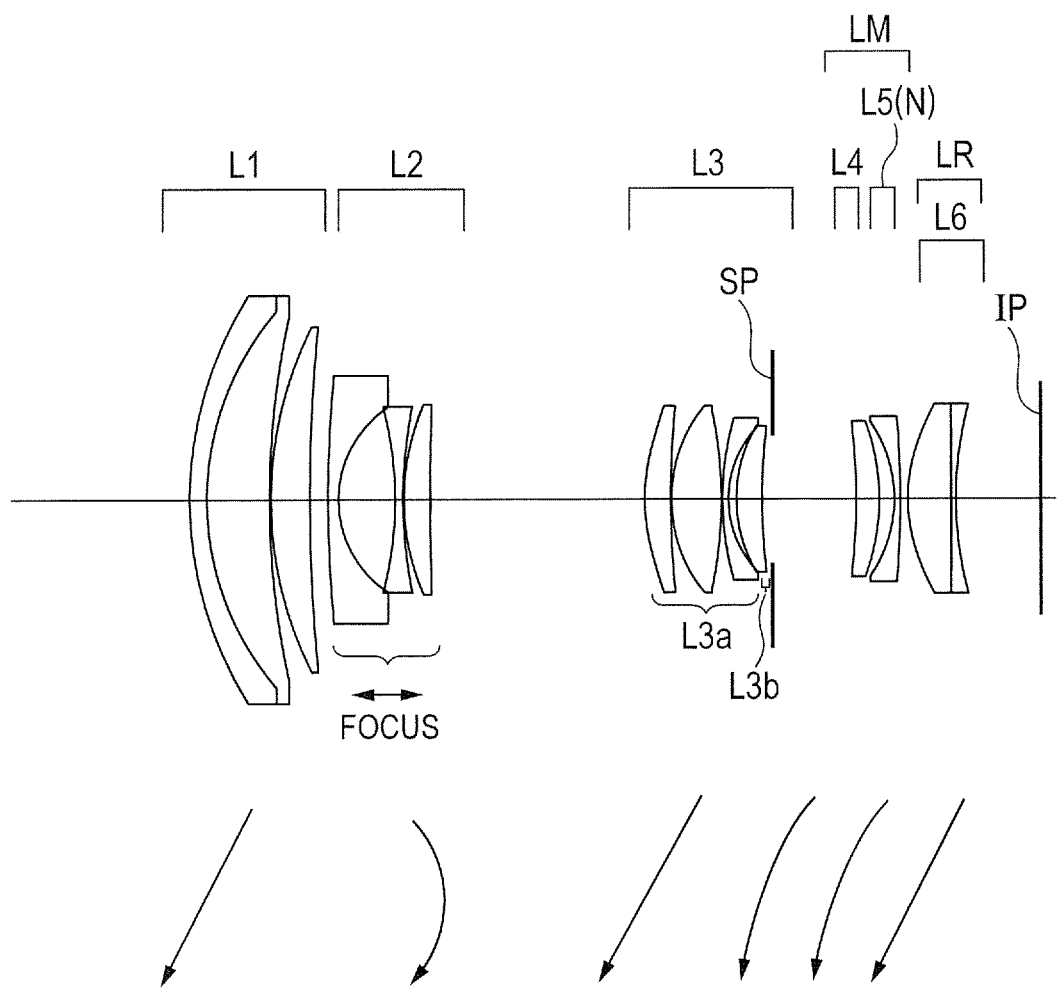
FIG. 9 is a lens cross-sectional view of a zoom lens of Example 5 of the present invention.
Figure 10A:
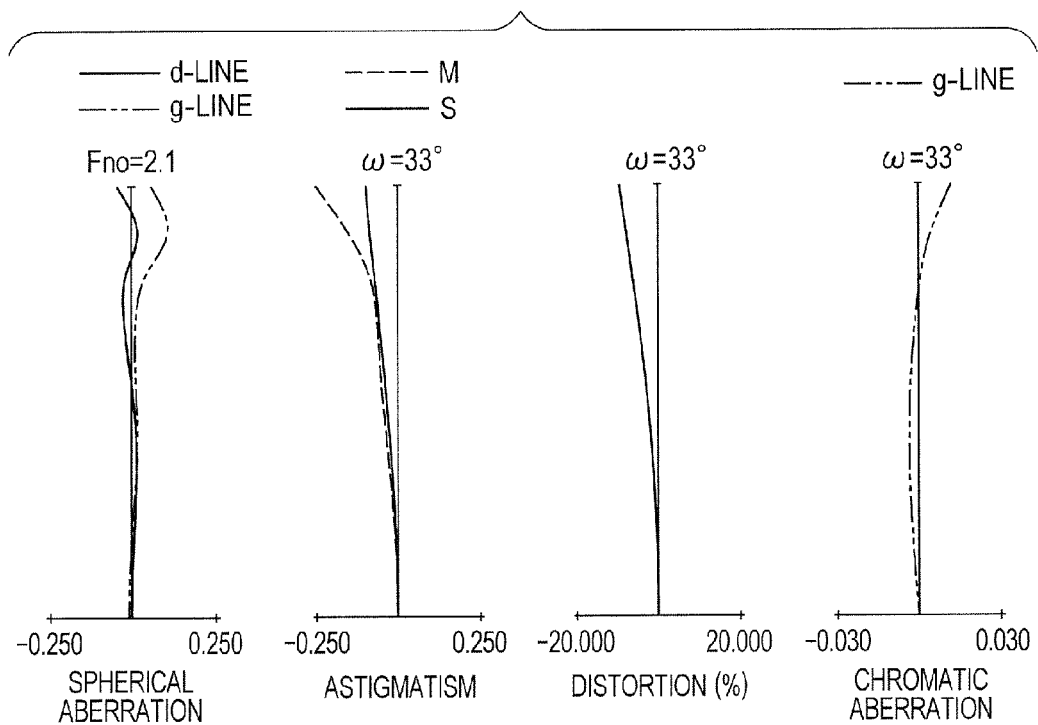
FIG. 10A is an aberration diagram at a wide angle end of the zoom lens of Example 5 of the present invention.
Figure 10B:
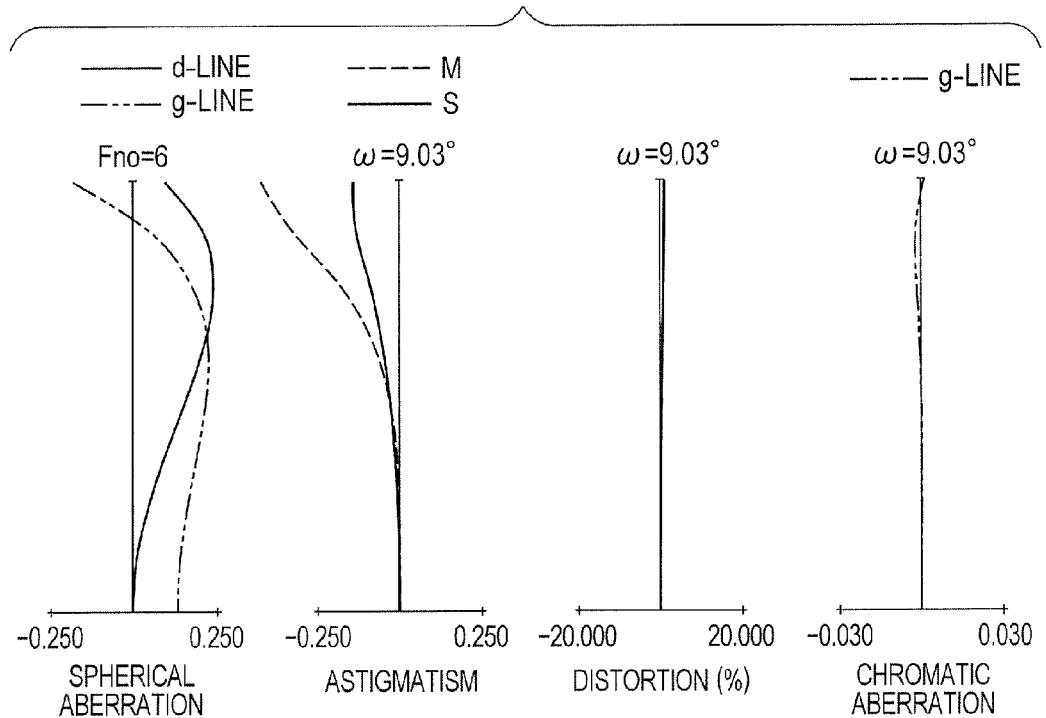
FIG. 10B is an aberration diagram at a telephoto end of the zoom lens of Example 5 of the present invention.
Figure 11:
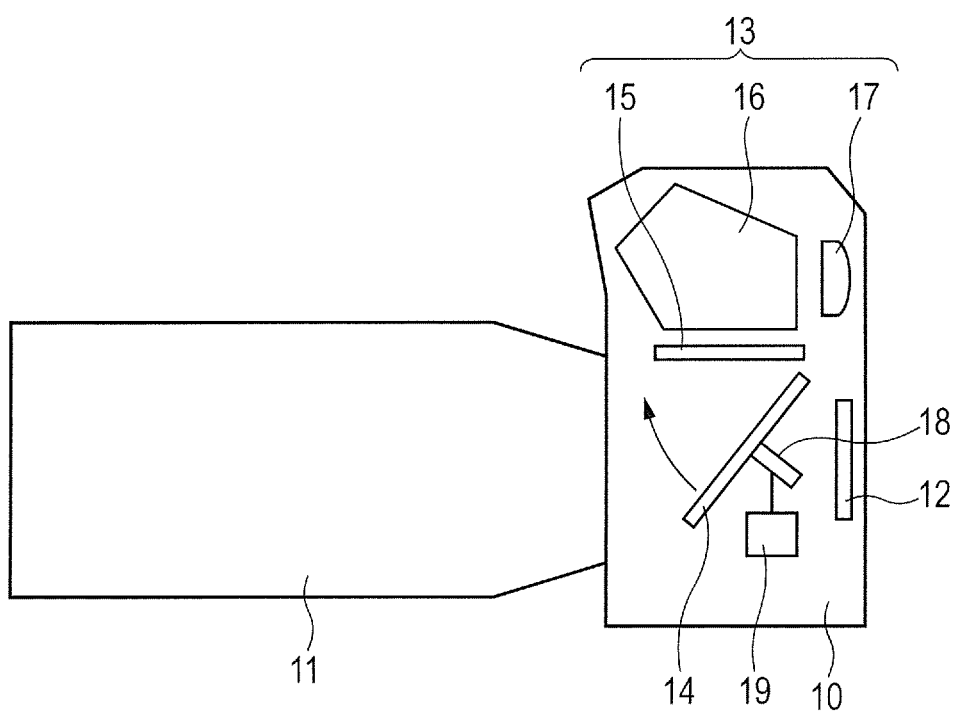
FIG. 11 is a schematic view of a main part of an image pickup apparatus according to the present invention.

FIG. 9 is a lens cross-sectional view when focusing is made on an object at infinity at a wide angle end of a zoom lens of Example 5 of the present invention. FIG. 10A and FIG. 10B are longitudinal aberration diagrams when focusing is made on the object at infinity at the wide angle end and a telephoto end of the zoom lens of Example 5, respectively. FIG. 11 is a schematic view of a main part of a camera (image pickup apparatus) including the zoom lens of the present invention. The zoom lens in each of Examples is an imaging lens system used for an image pickup apparatus such as a video camera, a digital camera, or a silver-halide film camera.

In the lens cross-sectional views, the left side is the object side (front side), and the right side is the image side (rear side). In the lens cross-sectional views, an order of a lens unit from the object side is denoted by i, and an i-th lens unit is denoted by Li. A middle lens group LM includes at least one lens unit having a negative refractive power. A lens unit N has the highest negative refractive power (largest absolute value of the negative refractive power) of the lens units forming the middle lens group LM. A final lens unit LR having a positive refractive power is located closest to the object side. A lens subunit L3a and a lens subunit L3b are arranged on the object side and the image side of the widest air interval in the third lens unit L3, respectively.

In each of Examples 1, 2, and 3, the zoom lens includes, in order from the object side to the image side, a first lens unit L1 having a positive refractive power, a second lens unit L2 having a negative refractive power, a third lens unit L3 having a positive refractive power, a fourth lens unit L4 having a negative refractive power, and a fifth lens unit L5 having a positive refractive power. During zooming, the lens units are moved along loci that are different from one another. In each of Examples 1, 2, and 3, the fourth lens unit L4 corresponds to the middle lens group LM. Moreover, the fourth lens unit L4 corresponds to the lens unit N.

In Example 4, the zoom lens includes, in order from the object side to the image side, a first lens unit L1 having a positive refractive power, a second lens unit L2 having a negative refractive power, a third lens unit L3 having a positive refractive power, a fourth lens unit L4 having a negative refractive power, a fifth lens unit L5 having a negative refractive power, and a sixth lens unit L6 having a positive refractive power. During zooming, the lens units are moved along loci that are different from one another. In Example 4, the fourth lens unit L4 and the fifth lens unit L5 correspond to the middle lens group LM. Moreover, the fourth lens unit L4 corresponds to the lens unit N.

In Example 5, the zoom lens includes, in order from the object side to the image side, a first lens unit L1 having a positive refractive power, a second lens unit L2 having a negative refractive power, a third lens unit L3 having a positive refractive power, a fourth lens unit L4 having a positive refractive power, a fifth lens unit L5 having a negative refractive power, and a sixth lens unit L6 having a positive refractive power. During zooming, the lens units are moved along loci that are different from one another. In Example 5, the fourth lens unit L4 and the fifth lens unit L5 correspond to the middle lens group LM. The fifth lens unit L5 corresponds to the lens unit N.

In each of the lens cross-sectional views, an aperture stop SP is arranged on the image side of the third lens unit L3. On an image plane IP, an image pickup plane of a solid-state image pickup element (photo-electric conversion element) such as a CCD sensor or a CMOS sensor is put when the zoom lens of the present invention is used as a photographing optical system of a video camera or a digital still camera, and a film surface is put when the zoom lens of the present invention is used for a silver-halide film camera.

In the spherical aberration diagrams, a d-line is represented by the solid line, and a g-line is represented by the two-dot chain line. In the astigmatism diagrams, a meridional image plane is represented by the dotted line M, and a sagittal image plane is represented by the solid line S. In the lateral chromatic aberration diagrams, a g-line is illustrated. A half angle of field is represented by ω, and an F-number is represented by Fno. Note that, in each of Examples to be described below, the wide angle end and the telephoto end refer to zoom positions when each of the lens units is positioned at both ends of a range in which the lens unit is mechanically movable on an optical axis, respectively. The arrows indicate movement loci of the lens units during zooming from the wide angle end to the telephoto end. The arrows also indicate movement directions during focusing.

The zoom lens in each of Examples includes, in order from the object side to the image side, a first lens unit L1 having a positive refractive power, a second lens unit L2 having a negative refractive power, a third lens unit L3 having a positive refractive power, and an aperture stop SP. The zoom lens also includes a middle lens group LM including at least one lens unit having a negative refractive power, and a final lens unit LR having a positive refractive power. During zooming, an interval between adjacent lens units is changed.

The third lens unit L3 includes at least two positive lenses and at least one negative lens. A combined focal length of the first lens unit L1 and the second lens unit L2 at the telephoto end is represented by f12t. A focal length of a lens unit N having the largest absolute value of the negative refractive power of the lens units forming the middle lens group LM is represented by fn. A focal length of the third lens unit L3 is represented by f3, and a focal length of the zoom lens at the telephoto end is represented by ft. Then, the following conditional expressions are satisfied:

$$1.50 < |f12t|/f3 < 2.20 \quad (1); \text{ and}$$

$$0.28 < |fn|/ft < 0.59 \quad (2).$$

In each of Examples, the number of lens units, the refractive powers of the lens units, a position of the aperture stop SP, and the like are specified as described above to maintain good telecentricity despite the compact entire system of the zoom lens. Further, variations in aberrations during zooming are reduced with a large aperture diameter from the wide angle end to the telephoto end.

Moreover, the third lens unit L3 is formed of four lenses as described above to reduce the variations in aberrations such as spherical aberration and coma during zooming. Moreover, the aperture stop SP is located on the image side in order to reduce a diameter of a stop unit as much as possible in consideration of a space required to arrange the stop unit. Note that, it is more desired to arrange the aperture stop SP closest to the image side.

Next, technical meanings of the conditional expressions described above are described. The conditional expression (1) defines a ratio of the combined focal length of the first lens unit L1 and the second lens unit L2 at the telephoto end to the focal length of the third lens unit L3. When the ratio falls below the lower limit value of the conditional expression (1), the diameter of the stop unit becomes large. Thus, it is difficult to set a diameter of a lens barrel of the zoom lens small. To the contrary, when the ratio exceeds the upper limit value, the positive refractive power of the third lens unit L3 becomes too large, and the variations in spherical aberration and coma become large during zooming.

The conditional expression (2) relates to a ratio between the focal length of the lens unit N having the largest absolute value of the negative refractive power included in the middle lens group LM and the focal length of the zoom lens at the telephoto end. When the ratio falls below the lower limit value of the conditional expression (2), the negative refractive power of the lens unit N becomes too strong, that is, the absolute value of the negative refractive power becomes large, to increase the variations in aberrations during zooming, which is undesirable. To the contrary, when the ratio exceeds the upper limit value, a total lens length becomes long. It is more preferred to set the numerical value ranges of the conditional expressions (1) and (2) as follows.

$$1.60 < |f12t|/f3 < 2.17 \quad (1a); \text{ and}$$

$$0.28 < |fn|/ft < 0.55 \quad (2a).$$

As described above, according to the present invention, the zoom lens having a high aperture ratio in which the size and diameter of the zoom lens are reduced is obtained, but it is further preferred to satisfy at least one of the conditional expressions below.

A lateral magnification of the final lens unit LR at the wide angle end is represented by βkw. The third lens unit L3 includes, across the widest air interval, a lens subunit L3a and a lens subunit L3b on the object side and the image side, respectively. A focal length of the lens subunit L3a as a part of the third lens unit L3 is represented by f3a. The first lens unit L1 includes at least one negative lens and at least one positive lens, the first lens unit L1 is moved during zooming, and a focal length of the first lens unit L1 is represented by f1. The second lens unit L2 includes at least one negative lens and at least one positive lens, the second lens unit L2 is moved during zooming, and a focal length of the second lens unit L2 is represented by f2.

Then, it is preferred to satisfy at least one of the following conditional expressions:

$$0.30 < \beta kw < 0.80 \quad (3);$$

$$0.10 < f3/ft < 0.40 \quad (4);$$

$$0.80 < f3a/f3 < 2.00 \quad (5);$$

$$0.50 < f1/ft < 1.20 \quad (6); \text{ and}$$

$$0.10 < |f2|/ft < 0.24 \quad (7).$$

Note that, in both of Numerical Examples 2 and 4 corresponding to Examples 2 and 4 to be described later, respectively, a lens interval in the third lens unit L3 is 0.12. However, an actual value of a lens interval d17 is 0.124, and is shown after being rounded off in each of Numerical Examples. Therefore, the interval represented by d17 is the widest air interval in the third lens unit L3. Therefore, as illustrated in FIG. 3 and FIG. 7, in the third lens unit L3, two lenses on the object side correspond to the lens subunit L3a, and two lenses on the image side correspond to the lens subunit L3b.

Next, technical meanings of the conditional expressions described above are described. The conditional expression (3) defines the lateral magnification of the final lens unit LR at the wide angle end. When βkw falls below the lower limit value of the conditional expression (3), the positive refractive power of the final lens unit LR becomes too strong, and the final lens unit LR is required to include a plurality of lenses. Thus, it is difficult to downsize at a time of being retracted and contained. To the contrary, when βkw exceeds the upper limit value, an angle of incidence of an off-axial beam on a sensor (image pickup element) becomes large due to the refractive power of the lens unit having the negative refractive power, which is arranged in the middle lens group LM, in other words, a pupil position on the image side becomes short to reduce the telecentricity, which is undesirable.

The conditional expression (4) relates to a ratio between the focal length of the third lens unit L3 and the focal length of the zoom lens at the telephoto end. When the ratio falls below the lower limit value of the conditional expression (4), the positive refractive power of the third lens unit L3 becomes too strong, and the variations in aberrations such as the spherical aberration and the coma during zooming are increased. To the contrary, when the ratio exceeds the upper limit value, a movement amount of the third lens unit L3 is increased during zooming. Thus, it is difficult to downsize the zoom lens.

The conditional expression (5) relates to a ratio between the focal length of the lens subunit L3a forming the third lens unit L3 and the focal length of the third lens unit L3. When the ratio falls below the lower limit value of the conditional expression (5), and hence the positive refractive power of the lens subunit L3a becomes large, the variations in spherical aberration and coma become large during zooming. To the contrary, when the ratio exceeds the upper limit value, a principal point position of the third lens unit L3 is located on the image side. Thus, it is difficult to downsize the zoom lens.

The conditional expression (6) relates to a ratio between the focal length of the first lens unit L1 and the focal length of the zoom lens at the telephoto end. When the ratio falls below the lower limit value of the conditional expression (6), and hence the positive refractive power of the first lens unit L1 becomes strong, field curvature is increased. On the other hand, when the ratio exceeds the upper limit value, the total lens length becomes long. Thus, it is difficult to downsize the zoom lens.

The conditional expression (7) relates to a ratio between the focal length of the second lens unit L2 and the focal length of the zoom lens at the telephoto end. When the ratio falls below the lower limit value of the conditional expression (7), and hence the negative refractive power of the second lens unit L2 is too strong, that is, the absolute value of the negative refractive power becomes large, the field curvature is increased. On the other hand, when the ratio exceeds the upper limit value, the total lens length is increased. Thus, it is difficult to downsize the zoom lens.

It is more preferred to set the numerical value ranges of the conditional expressions (3) to (7) as follows:

$$0.50<\beta kw<0.79 \quad (3a);$$

$$0.18<f3/ft<0.31 \quad (4a);$$

$$0.90<f3a/f3<1.75 \quad (5a);$$

$$0.60<f1/ft<1.10 \quad (6a); \text{ and}$$

$$0.11<|f2|/ft<0.20 \quad (7a).$$

Next, a lens configuration in each of Examples is described.

Referring to FIG. 1, Example 1 of the present invention is described. The zoom lens in Example 1 includes, in order from the object side to the image side, a first lens unit L1 having a positive refractive power, a second lens unit L2 having a negative refractive power, a third lens unit L3 having a positive refractive power, a fourth lens unit L4 having a negative refractive power, and a fifth lens unit L5 having a positive refractive power. The fourth lens unit L4 corresponds to the middle lens group LM, and the fifth lens unit L5 corresponds to the final lens unit LR.

During zooming from the wide angle end to the telephoto end, the first lens unit L1 is moved toward the object side. Note that, in order to secure an illuminance ratio on the periphery of an image plane in an intermediate zoom range, the first lens unit L1 may be moved along a locus that is convex toward the image side. The second lens unit L2 is moved along a locus that is convex toward the image side, and the third lens unit L3 is moved toward the object side to perform zooming. The fourth lens unit L4 and the fifth lens unit L5 are moved along loci that are convex toward the object side. The third lens unit L3 includes, across the widest air interval, a lens subunit L3a and a lens subunit L3b on the object side and the image side, respectively. The lens subunit L3a includes, in order from the object side to the image side, a positive lens and a negative lens.

The lens subunit L3b includes a positive lens and a negative lens. An aperture stop SP is arranged on the image side of the third lens unit L3. The third lens unit L3 includes at least two positive lenses and at least one negative lens to reduce the variations in spherical aberration and coma during zooming while increasing the aperture ratio.

The aperture stop SP is arranged on the image side of the third lens unit L3 to reduce the diameter of the stop unit. When the aperture stop SP is arranged on the image side of the third lens unit L3, an off-axial principal beam enters the sensor at a large angle at the wide angle end, and at that time, the lateral magnification of the final lens unit having the positive refractive power is set in a predetermined range. This prevents the angle of incidence from becoming large to obtain the good telecentricity. Example 1 satisfies the conditional expressions (1) to (7) described above to obtain the above-mentioned effects.

In Example 1, focus adjustment (focusing) at a time when a photographing distance has changed is performed by the lens subunit L3a. Next, referring to FIG. 3, Example 2 of the present invention is described. The number of lens units, the refractive powers of the lens units, and the like of the zoom lens in Example 2 are the same as those in Example 1. During zooming from the wide angle end to the telephoto end, the first lens unit L1 is moved toward the object side. Note that, in order to secure the illuminance ratio on the periphery of the image plane in the intermediate zoom range, the first lens unit L1 may be moved along a locus that is convex toward the image side. All of the second lens unit L2 to the fifth lens unit L5 are moved toward the object side.

The lens subunit L3a as a part of the third lens unit L3 includes, in order from the object side to the image side, a positive lens and a positive lens, and the lens subunit L3b includes a negative lens and a positive lens. The aperture stop SP is arranged on the image side of the third lens unit L3. The configuration of the third lens unit L3 and the position of the aperture stop SP are specified as described above to obtain effects similar to those in Example 1.

Example 2 satisfies the conditional expressions (1) to (7) described above to obtain the above-mentioned effects. In Example 2, the focus adjustment at the time when the photographing distance has changed is performed by lenses closest to the image side of the second lens unit L2.

Next, referring to FIG. 5, Example 3 of the present invention is described. The number of lens units, the refractive powers of the lens units, and the like of the zoom lens in Example 3 are the same as those in Example 1. The movements of the lens units during zooming from the wide angle end to the telephoto end are the same as those in Example 1. The lens subunit L3a of the third lens unit L3 includes a positive lens. The lens subunit L3b includes a positive lens, a negative lens, and a positive lens. The aperture stop SP is arranged on the image side of the third lens unit L3. The configuration of the third lens unit L3 and the position of the aperture stop SP are specified as described above to obtain effects similar to those in Example 1.

Example 3 satisfies the conditional expressions (1) to (7) described above to obtain the above-mentioned effects. In Example 3, the focus adjustment at the time when the photographing distance has changed is performed by the second lens unit L2.

Next, referring to FIG. 7, Example 4 of the present invention is described. The zoom lens in Example 4 includes, in order from the object side to the image side, a first lens unit L1 having a positive refractive power, a second lens unit L2 having a negative refractive power, a third lens unit L3 having a positive refractive power, and a fourth lens unit L4 having a negative refractive power. The zoom lens also includes a fifth lens unit L5 having a negative refractive power, and a sixth lens unit L6 having a positive refractive power.

The fourth lens unit L4 and the fifth lens unit L5 correspond to the middle lens group LM, and the sixth lens unit L6 corresponds to the final lens unit LR. During zooming from the wide angle end to the telephoto end, the lens units are moved along loci that are different from one another toward the object side. A lens subunit L3a of the third lens unit L3 includes, in order from the object side to the image side, a positive lens and a positive lens, and a lens subunit L3b includes a negative lens and a positive lens. An aperture stop SP is arranged on the image side of the third lens unit L3. The configuration of the third lens unit L3 and the position of the aperture stop SP are specified to obtain effects similar to those in Example 1. Example 4 satisfies the conditional expressions (1) to (7) described above to obtain the above-mentioned effects.

In Example 4, the focus adjustment at the time when the photographing distance has changed is performed by the lens closest to the image side of the second lens unit L2. Next, referring to FIG. 9, Example 5 of the present invention is described.

The zoom lens in Example 5 includes, in order from the object side to the image side, a first lens unit L1 having a positive refractive power, a second lens unit L2 having a negative refractive power, a third lens unit L3 having a positive refractive power, and a fourth lens unit L4 having a positive refractive power. The zoom lens also includes a fifth lens unit L5 having a negative refractive power, and a sixth lens unit L6 having a positive refractive power. The fourth lens unit L4 and the fifth lens unit L5 correspond to the middle lens group LM, and the sixth lens unit L6 corresponds to the final lens unit LR.

During zooming from the wide angle end to the telephoto end, the first lens unit L1 is moved toward the object side. Note that, in order to secure the illuminance ratio on the periphery of the image plane in the intermediate zoom range, the first lens unit L1 may be moved along a locus that is convex toward the image side. The second lens unit L2 is moved along a locus that is convex toward the image side. All of the third lens unit L3 to the sixth lens unit L6 are moved toward the object side. A lens subunit L3a of the third lens unit L3 includes, in order from the object side to the image side, a positive lens, a positive lens, and a negative lens, and a lens subunit L3b includes a positive lens. An aperture stop SP is arranged on the image side of the third lens unit L3.

The configuration of the third lens unit L3 and the position of the aperture stop SP are specified as described above to obtain effects similar to those in Example 1. Example 5 satisfies the conditional expressions (1) to (7) described above to obtain the above-mentioned effects. In Example 5, the focus adjustment at the time when the photographing distance has changed is performed by the second lens unit L2.

Next, an example of using the zoom lens according to the present invention is described with reference to FIG. 11. In FIG. 11, a main body 10 of a single lens reflex camera and an interchangeable lens 11 equipped with the zoom lens according to the present invention are illustrated. A light-sensitive surface 12 is a silver-halide film configured to record a subject image obtained through the interchangeable lens 11, a solid-state image pickup element (photo-electric conversion element) configured to receive light of the subject image, or the like. A viewfinder optical system 13 is used to observe the subject image from the interchangeable lens 11, and a quick return mirror 14 is rotated to switchably transmit the subject image from the interchangeable lens 11 to the light-sensitive surface 12 and the viewfinder optical system 13.

In a case where the subject image is to be observed with the viewfinder, the subject image formed on a focusing screen 15 through the quick return mirror 14 is converted to an erect image by a pentaprism 16, and then enlarged by an eyepiece optical system 17 for observation. A submirror 18 and an automatic focus detection device 19 are also illustrated.

At a time of photography, the quick return mirror 14 is rotated in a direction of the arrow so that the subject image is formed and recorded on the light-sensitive surface recording unit 12. Thus applying the zoom lens according to the present invention to optical equipment such as the interchangeable lens of the single lens reflex camera may realize optical equipment having high optical performance. Note that, the present invention is equally applicable to a single lens reflex (SLR) camera without the quick return mirror. Moreover, the zoom lens according to the present invention is equally applicable to a video camera.

Numerical Examples 1 to 5 corresponding to Examples 1 to 5 are described below. In each of Numerical Examples, i indicates the order of surfaces from the object side, ri indicates the curvature radius of i-th (i-th surface), di indicates an interval between the i-th surface and the (i+1)th surface, and ndi and vdi indicate the refractive index and Abbe number of a material of the i-th lens based on the d-line, respectively. BF indicates back focus. A total lens length is a length from the first lens surface to the image plane. In aspherical surface data, aspherical surface coefficients in a case where aspherical surfaces are expressed by the following expression are shown.

$$x = \frac{h^2/R}{1 + \sqrt{1 - (1+k)(h/R)^2}} + A4 \cdot h^4 + A6 \cdot h^6 + A8 + A10 \cdot h^{10}$$

Provided that:
x represents a displacement amount from a reference surface in the optical axis direction;
h represents a height in a direction perpendicular to the optical axis;
R represents a radius of a quadratic surface as a base;
k represents a conic constant; and
An represents an n-th order aspherical surface coefficient.
Note that, the notation "e-Z" means "$10^{-Z}$". In addition, correspondence between each of the conditional expressions described above and numerical values in Numerical Examples is shown in Table 1.

Numerical Example 1

| Unit mm | | | | | |
|---|---|---|---|---|---|
| Surface data | | | | | |
| Surface number | r | d | nd | vd | Effective diameter |
| 1 | 83.630 | 2.00 | 1.94595 | 18.0 | 50.55 |
| 2 | 56.329 | 4.84 | 1.69680 | 55.5 | 46.69 |
| 3 | 118.394 | 0.15 | | | 44.31 |
| 4 | 37.508 | 5.23 | 1.69680 | 55.5 | 38.87 |
| 5 | 135.720 | (Variable) | | | 37.90 |
| 6 | 111.098 | 1.20 | 1.88300 | 40.8 | 29.97 |
| 7 | 13.991 | 7.31 | | | 21.74 |
| 8 | −34.445 | 0.90 | 1.80400 | 46.6 | 21.43 |
| 9 | 29.297 | 0.12 | | | 21.12 |
| 10 | 25.901 | 3.36 | 2.00178 | 19.3 | 21.37 |
| 11* | 924.715 | (Variable) | | | 21.16 |
| 12* | 13.866 | 6.19 | 1.76802 | 49.2 | 21.32 |
| 13 | 116.210 | 0.12 | | | 19.99 |
| 14* | 16.899 | 0.52 | 1.84666 | 23.8 | 17.93 |
| 15 | 10.637 | 5.09 | | | 16.06 |
| 16 | 20.341 | 3.92 | 1.59282 | 68.6 | 15.73 |
| 17 | −32.483 | 0.15 | | | 15.18 |
| 18 | −30.949 | 0.70 | 1.92286 | 20.9 | 15.06 |
| 19 | −86.436 | 1.34 | | | 14.78 |
| 20 (Stop) | ∞ | (Variable) | | | 13.76 |

-continued

| Unit mm | | | | | |
|---|---|---|---|---|---|
| 21 | 795.325 | 0.70 | 1.69680 | 55.5 | 16.68 |
| 22 | 17.430 | 2.29 | 1.68893 | 31.1 | 16.94 |
| 23 | 26.588 | (Variable) | | | 17.12 |
| 24* | 19.148 | 4.35 | 1.48749 | 70.2 | 21.03 |
| 25 | 187.841 | (Variable) | | | 21.16 |
| Image surface | ∞ | | | | |

Aspherical surface data

Eleventh surface

K = 5.69819e+003  A4 = 1.68666e−006  A6 = −9.06463e−009
A8 = 2.71886e−010  A10 = −1.17899e−012

Twelfth surface

K = −5.08067e−001  A4 = 1.27424e−005  A6 = 5.68407e−009
A8 = 3.97908e−010

Fourteenth surface

K = −5.12841e−001  A4 = −1.45830e−005  A6 = −2.79382e−008
A8 = −2.06681e−009  A10 = 6.24676e−012

Twenty-fourth surface

K = 0.00000e+000  A4 = −4.03606e−005  A6 = 8.14320e−008
A8 = −7.37539e−010  A10 = 2.06121e−012

Various data
Zoom ratio 4.71

| | Wide angle | Intermediate | Telephoto |
|---|---|---|---|
| Focal length | 16.09 | 41.83 | 75.78 |
| F-number | 2.07 | 5.15 | 6.00 |
| Half angle of field (degree) | 36.26 | 18.01 | 10.17 |
| Image height | 11.80 | 13.60 | 13.60 |
| Total lens length | 100.68 | 110.04 | 120.89 |
| BF | 15.19 | 27.94 | 26.84 |
| d5 | 0.58 | 12.48 | 22.70 |
| d11 | 24.56 | 7.30 | 1.39 |
| d20 | 2.63 | 7.73 | 17.32 |
| d23 | 7.27 | 4.13 | 2.17 |
| d25 | 15.19 | 27.94 | 26.84 |
| Entrance pupil position | 29.21 | 58.29 | 103.55 |
| Exit pupil position | −17.75 | −18.76 | −25.40 |
| Front principal point position | 37.44 | 62.65 | 69.40 |
| Rear principal point position | −0.90 | −13.89 | −48.94 |

Zoom lens unit data

| Unit | First surface | Focal length | Lens structure length | Front principal point position | Rear principal point position |
|---|---|---|---|---|---|
| L1 | 1 | 68.67 | 12.22 | 0.82 | −6.24 |
| L2 | 6 | −13.81 | 12.88 | 1.91 | −7.91 |
| L3 | 12 | 21.56 | 18.03 | 2.70 | −12.31 |
| L4 | 21 | −39.27 | 2.99 | 1.81 | 0.04 |
| L5 | 24 | 43.37 | 4.35 | −0.33 | −3.23 |

Single lens data

| Lens | First surface | Focal length |
|---|---|---|
| 1 | 1 | −189.14 |
| 2 | 2 | 149.42 |
| 3 | 4 | 72.80 |
| 4 | 6 | −18.23 |
| 5 | 8 | −19.57 |
| 6 | 10 | 26.55 |
| 7 | 12 | 19.98 |
| 8 | 14 | −35.25 |
| 9 | 16 | 21.70 |
| 10 | 18 | −52.56 |

-continued

| Unit mm | | |
|---|---|---|
| 11 | 21 | −25.58 |
| 12 | 22 | 66.66 |
| 13 | 24 | 43.37 |

Numerical Example 2

| Unit mm | | | | | |
|---|---|---|---|---|---|

Surface data

| Surface number | r | d | nd | vd | Effective diameter |
|---|---|---|---|---|---|
| 1 | 84.913 | 2.00 | 1.94595 | 18.0 | 41.34 |
| 2 | 51.982 | 6.37 | 1.69680 | 55.5 | 38.48 |
| 3 | 254.162 | 0.15 | | | 37.22 |
| 4 | 35.333 | 5.08 | 1.69680 | 55.5 | 35.40 |
| 5 | 129.758 | (Variable) | | | 34.35 |
| 6 | 67.698 | 1.16 | 1.88300 | 40.8 | 23.62 |
| 7 | 12.426 | 5.75 | | | 18.11 |
| 8 | −30.195 | 1.16 | 1.88300 | 40.8 | 17.67 |
| 9 | 41.751 | 0.14 | | | 17.33 |
| 10 | 27.001 | 3.17 | 1.94595 | 18.0 | 17.46 |
| 11 | −60.641 | 2.89 | | | 17.20 |
| 12* | −20.826 | 0.93 | 1.85400 | 40.4 | 15.64 |
| 13 | −65.343 | (Variable) | | | 15.67 |
| 14* | 21.180 | 3.89 | 1.69680 | 55.5 | 15.96 |
| 15 | 97.480 | 0.12 | | | 15.37 |
| 16 | 19.716 | 7.15 | 1.59282 | 68.6 | 15.02 |
| 17 | −49.409 | 0.12 | | | 13.05 |
| 18 | 84.086 | 0.70 | 1.84666 | 23.8 | 12.52 |
| 19* | 16.576 | 0.12 | | | 11.80 |
| 20 | 16.150 | 3.91 | 1.48749 | 70.2 | 11.80 |
| 21 | −167.499 | 1.16 | | | 11.03 |
| 22 (Stop) | ∞ | (Variable) | | | 10.45 |
| 23 | 1,436.281 | 0.70 | 1.69680 | 55.5 | 10.93 |
| 24 | 17.737 | 2.15 | 1.84666 | 23.8 | 11.18 |
| 25 | 23.319 | (Variable) | | | 11.35 |
| 26 | 19.197 | 4.50 | 1.48749 | 70.2 | 18.02 |
| 27 | 68.425 | (Variable) | | | 18.44 |
| Image surface | ∞ | | | | |

Aspherical surface data

Twelfth surface

K = 8.45178e−001  A4 = −5.64142e−006  A6 = 7.45369e−008
A8 = −1.38336e−009  A10 = 1.23619e−011

Fourteenth surface

K = −1.01557e−001  A4 = −7.76908e−007  A6 = −6.54270e−008
A8 = −1.95140e−010

Nineteenth surface

K = 6.64216e−001  A4 = 5.15408e−005  A6 = 2.33791e−007
A8 = −9.76227e−010  A10 = 1.37768e−011

Twenty-sixth surface

K = 0.00000e+000  A4 = −2.46987e−005  A6 = −5.66166e−009
A8 = 1.77393e−010  A10 = −5.99554e−013

Various data
Zoom ratio 4.71

| | Wide angle | Intermediate | Telephoto |
|---|---|---|---|
| Focal length | 17.94 | 41.76 | 84.48 |
| F-number | 2.94 | 5.00 | 6.00 |
| Half angle of field (degree) | 33.34 | 18.04 | 9.15 |
| Image height | 11.80 | 13.60 | 13.60 |
| Total lens length | 97.34 | 108.30 | 120.68 |
| BF | 13.21 | 25.00 | 30.35 |

-continued

Unit mm

| | | | |
|---|---|---|---|
| d5 | 0.58 | 9.85 | 19.17 |
| d13 | 16.03 | 6.07 | 1.28 |
| d22 | 2.62 | 8.68 | 14.20 |
| d25 | 11.61 | 5.39 | 2.39 |
| d27 | 13.21 | 25.00 | 30.35 |
| Entrance pupil position | 28.62 | 54.03 | 103.54 |
| Exit pupil position | −23.40 | −19.82 | −19.78 |
| Front principal point position | 37.77 | 56.88 | 45.67 |
| Rear principal point position | −4.73 | −16.76 | −54.13 |

Zoom lens unit data

| Unit | First surface | Focal length | Lens structure length | Front principal point position | Rear principal point position |
|---|---|---|---|---|---|
| L1 | 1 | 55.69 | 13.60 | 2.13 | −5.80 |
| L2 | 6 | −10.15 | 15.19 | 3.18 | −7.46 |
| L3 | 14 | 17.63 | 17.15 | 1.56 | −10.03 |
| L4 | 23 | −37.05 | 2.85 | 1.99 | 0.39 |
| L5 | 26 | 53.14 | 4.50 | −1.15 | −4.09 |

Single lens data

| Lens | First surface | Focal length |
|---|---|---|
| 1 | 1 | −145.99 |
| 2 | 2 | 92.58 |
| 3 | 4 | 68.17 |
| 4 | 6 | −17.41 |
| 5 | 8 | −19.70 |
| 6 | 10 | 20.10 |
| 7 | 12 | −36.14 |
| 8 | 14 | 38.04 |
| 9 | 16 | 24.72 |
| 10 | 18 | −24.50 |
| 11 | 20 | 30.43 |
| 12 | 23 | −25.78 |
| 13 | 24 | 74.37 |
| 14 | 26 | 53.14 |

Numerical Example 3

Unit mm

Surface data

| Surface number | r | d | nd | vd | Effective diameter |
|---|---|---|---|---|---|
| 1 | 65.228 | 2.00 | 1.94595 | 18.0 | 50.48 |
| 2 | 47.456 | 5.17 | 1.69680 | 55.5 | 46.53 |
| 3 | 88.160 | 0.15 | | | 44.02 |
| 4 | 41.871 | 4.94 | 1.69680 | 55.5 | 39.52 |
| 5 | 142.283 | (Variable) | | | 38.61 |
| 6 | 142.378 | 1.20 | 1.88300 | 40.8 | 26.67 |
| 7 | 13.179 | 6.05 | | | 20.00 |
| 8 | −47.464 | 0.90 | 1.88300 | 40.8 | 19.75 |
| 9 | 35.446 | 0.87 | | | 19.41 |
| 10 | 28.835 | 2.90 | 1.94595 | 18.0 | 19.89 |
| 11 | 1,740.640 | (Variable) | | | 19.80 |
| 12* | 15.453 | 5.04 | 1.77250 | 49.6 | 21.56 |
| 13 | 72.432 | 2.84 | | | 20.67 |
| 14 | 123.084 | 2.65 | 1.59282 | 68.6 | 18.43 |
| 15 | −45.869 | 0.12 | | | 17.62 |
| 16 | −69.440 | 0.70 | 1.84666 | 23.8 | 17.01 |
| 17* | 25.116 | 0.07 | | | 15.57 |
| 18 | 17.263 | 3.62 | 1.59282 | 68.6 | 15.59 |
| 19 | −87.337 | 1.16 | | | 15.15 |
| 20 (Stop) | ∞ | (Variable) | | | 14.23 |
| 21 | 349.729 | 0.70 | 1.69350 | 53.2 | 15.09 |
| 22 | 17.400 | 2.27 | 1.71736 | 29.5 | 15.39 |
| 23 | 25.276 | (Variable) | | | 15.62 |
| 24* | 19.082 | 4.93 | 1.48749 | 70.2 | 21.23 |
| 25 | 78.743 | (Variable) | | | 21.32 |
| Image surface | ∞ | | | | |

Aspherical surface data

Twelfth surface

K = −6.46132e−001  A4 = 2.37777e−005  A6 = 6.99525e−008
A8 = 1.74530e−010

Seventeenth surface

K = 1.62306e+000  A4 = 7.24456e−005  A6 = 5.40826e−007
A8 = −1.74497e−009  A10 = 5.28140e−011

Twenty-fourth surface

K = 0.00000e+000  A4 = −3.46423e−005  A6 = 3.25939e−008
A8 = −1.62350e−010  A10 = 5.24958e−013

Various data
Zoom ratio 4.71

| | Wide angle | Intermediate | Telephoto |
|---|---|---|---|
| Focal length | 16.61 | 41.76 | 78.21 |
| F-number | 2.07 | 4.64 | 6.00 |
| Half angle of field (degree) | 35.39 | 18.04 | 9.86 |
| Image height | 11.80 | 13.60 | 13.60 |
| Total lens length | 97.81 | 108.49 | 120.70 |
| BF | 14.83 | 27.15 | 26.20 |
| d5 | 2.15 | 14.73 | 26.99 |
| d11 | 22.55 | 7.13 | 1.16 |
| d20 | 2.62 | 7.07 | 16.13 |
| d23 | 7.41 | 4.14 | 1.96 |
| d25 | 14.83 | 27.15 | 26.20 |
| Entrance pupil position | 29.86 | 59.24 | 111.51 |
| Exit pupil position | −17.17 | −17.16 | −22.14 |
| Front principal point position | 37.84 | 61.64 | 63.17 |
| Rear principal point position | −1.78 | −14.61 | −52.02 |

Zoom lens unit data

| Unit | First surface | Focal length | Lens structure length | Front principal point position | Rear principal point position |
|---|---|---|---|---|---|
| L1 | 1 | 75.45 | 12.25 | −0.12 | −7.17 |
| L2 | 6 | −13.84 | 11.91 | 1.10 | −8.51 |
| L3 | 12 | 20.41 | 16.19 | 1.62 | −10.55 |
| L4 | 21 | −40.19 | 2.97 | 1.96 | 0.21 |
| L5 | 24 | 50.30 | 4.93 | −1.03 | −4.26 |

Single lens data

| Lens | First surface | Focal length |
|---|---|---|
| 1 | 1 | −194.76 |
| 2 | 2 | 140.20 |
| 3 | 4 | 83.46 |
| 4 | 6 | −16.52 |
| 5 | 8 | −22.86 |
| 6 | 10 | 30.97 |
| 7 | 12 | 24.49 |
| 8 | 14 | 56.70 |
| 9 | 16 | −21.71 |
| 10 | 18 | 24.63 |
| 11 | 21 | −26.43 |
| 12 | 22 | 69.47 |
| 13 | 24 | 50.30 |

Numerical Example 4

Unit mm

Surface data

| Surface number | r | d | nd | vd | Effective diameter |
|---|---|---|---|---|---|
| 1 | 119.112 | 2.00 | 1.94595 | 18.0 | 46.08 |
| 2 | 63.888 | 6.06 | 1.69680 | 55.5 | 44.47 |
| 3 | 1,050.812 | 0.15 | | | 43.79 |
| 4 | 36.880 | 5.34 | 1.69680 | 55.5 | 40.87 |
| 5 | 143.627 | (Variable) | | | 40.40 |
| 6 | 72.821 | 1.16 | 1.88300 | 40.8 | 24.35 |
| 7 | 12.770 | 5.70 | | | 18.60 |
| 8 | −28.799 | 1.16 | 1.88300 | 40.8 | 17.50 |
| 9 | 63.191 | 0.13 | | | 18.21 |
| 10 | 29.919 | 3.12 | 1.94595 | 18.0 | 18.31 |
| 11 | −54.899 | 2.75 | | | 18.08 |
| 12* | −20.920 | 0.93 | 1.85400 | 40.4 | 16.45 |
| 13 | −90.252 | (Variable) | | | 16.46 |
| 14* | 21.679 | 3.74 | 1.69680 | 55.5 | 16.42 |
| 15 | 90.714 | 0.12 | | | 15.80 |
| 16 | 19.575 | 7.47 | 1.59282 | 68.6 | 15.40 |
| 17 | −50.307 | 0.12 | | | 13.26 |
| 18 | 62.201 | 0.70 | 1.84666 | 23.8 | 12.67 |
| 19* | 15.943 | 0.12 | | | 11.94 |
| 20 | 15.788 | 4.18 | 1.48749 | 70.2 | 11.94 |
| 21 | −101.480 | 1.16 | | | 11.09 |
| 22 (Stop) | ∞ | (Variable) | | | 10.43 |
| 23 | 272.154 | 0.70 | 1.69680 | 55.5 | 11.51 |
| 24 | 17.400 | 2.09 | 1.84666 | 23.8 | 11.79 |
| 25 | 21.457 | (Variable) | | | 11.96 |
| 26 | −22.110 | 0.75 | 1.58913 | 61.1 | 13.96 |
| 27 | −30.237 | (Variable) | | | 14.71 |
| 28* | 21.727 | 4.89 | 1.48749 | 70.2 | 17.78 |
| 29 | 2,085.623 | (Variable) | | | 18.65 |
| Image surface | ∞ | | | | |

Aspherical surface data

Twelfth surface

K = 8.58338e−001  A4 = 5.57146e−006  A6 = 6.59697e−008
A8 = −9.18752e−010  A10 = 8.56606e−012

Fourteenth surface

K = −1.76906e−001  A4 = −3.03720e−006  A6 = −6.37897e−008
A8 = −1.81295e−010

Nineteenth surface

K = 6.24337e−001  A4 = 4.57564e−005  A6 = 2.09637e−007
A8 = −1.19599e−009  A10 = 1.23599e−011

Twenty-eighth surface

K = 0.00000e+000  A4 = −2.30829e−005  A6 = 1.71728e−008
A8 = 9.53180e−011  A10 = −2.74176e−013

Various data
Zoom ratio 4.71

| | Wide angle | Intermediate | Telephoto |
|---|---|---|---|
| Focal length | 18.04 | 41.76 | 84.96 |
| F-number | 2.94 | 5.00 | 6.00 |
| Half angle of field (degree) | 33.19 | 18.04 | 9.09 |
| Image height | 11.80 | 13.60 | 13.60 |
| Total lens length | 96.81 | 108.02 | 120.68 |
| BF | 11.81 | 22.76 | 25.78 |
| d5 | 0.58 | 10.81 | 20.53 |
| d13 | 16.27 | 6.29 | 1.28 |
| d22 | 2.62 | 8.56 | 14.47 |
| d25 | 10.43 | 4.39 | 3.52 |
| d27 | 0.58 | 0.69 | 0.58 |
| d29 | 11.81 | 22.76 | 25.78 |
| Entrance pupil position | 28.15 | 55.67 | 107.37 |
| Exit pupil position | −23.83 | −20.63 | −24.33 |
| Front principal point position | 37.06 | 57.24 | 48.30 |
| Rear principal point position | −6.23 | −18.99 | −59.18 |

Zoom lens unit data

| Unit | First surface | Focal length | Lens structure length | Front principal point position | Rear principal point position |
|---|---|---|---|---|---|
| L1 | 1 | 57.22 | 13.55 | 2.62 | −5.27 |
| L2 | 6 | −10.33 | 14.95 | 3.25 | −7.11 |
| L3 | 14 | 17.23 | 17.59 | 2.05 | −10.07 |
| L4 | 23 | −36.03 | 2.78 | 2.06 | 0.49 |
| L5 | 26 | −144.60 | 0.75 | −1.34 | −1.83 |
| L6 | 28 | 45.00 | 4.89 | −0.03 | −3.32 |

Single lens data

| Lens | First surface | Focal length |
|---|---|---|
| 1 | 1 | −148.28 |
| 2 | 2 | 97.38 |
| 3 | 4 | 69.78 |
| 4 | 6 | −17.70 |
| 5 | 8 | −22.27 |
| 6 | 10 | 20.84 |
| 7 | 12 | −32.09 |
| 8 | 14 | 39.99 |
| 9 | 16 | 24.76 |
| 10 | 18 | −25.50 |
| 11 | 20 | 28.36 |
| 12 | 23 | −26.71 |
| 13 | 24 | 87.97 |
| 14 | 26 | −144.60 |
| 15 | 28 | 45.00 |

Numerical Example 5

Unit mm

Surface data

| Surface number | r | d | nd | vd | Effective diameter |
|---|---|---|---|---|---|
| 1 | 44.867 | 2.00 | 1.84666 | 23.8 | 46.40 |
| 2 | 33.933 | 7.29 | 1.49700 | 81.5 | 42.74 |
| 3 | 100.405 | 0.15 | | | 41.34 |
| 4 | 45.199 | 4.53 | 1.60311 | 60.6 | 39.12 |
| 5 | 203.790 | (Variable) | | | 38.27 |
| 6 | 157.168 | 1.20 | 1.88300 | 40.8 | 27.68 |
| 7 | 13.080 | 6.61 | | | 20.54 |
| 8 | −43.200 | 0.90 | 1.83481 | 42.7 | 20.39 |
| 9 | 54.584 | 0.12 | | | 20.48 |
| 10 | 28.087 | 3.05 | 1.92286 | 18.9 | 20.98 |
| 11* | 512.023 | (Variable) | | | 20.78 |
| 12* | 22.101 | 3.03 | 1.70154 | 41.2 | 20.56 |
| 13 | 111.773 | 0.12 | | | 20.48 |
| 14* | 18.689 | 5.81 | 1.48749 | 70.2 | 20.61 |
| 15 | −50.930 | 0.12 | | | 19.95 |
| 16 | 34.404 | 0.70 | 1.84666 | 23.8 | 17.74 |
| 17 | 12.329 | 0.91 | | | 15.88 |
| 18 | 16.867 | 3.00 | 1.56907 | 71.3 | 15.88 |
| 19 | 70.034 | 1.15 | | | 15.26 |
| 20 (Stop) | ∞ | (Variable) | | | 14.84 |
| 21 | −76.632 | 2.70 | 1.71736 | 29.5 | 16.57 |
| 22 | −26.085 | (Variable) | | | 16.94 |
| 23 | −15.929 | 0.70 | 1.74400 | 44.8 | 16.84 |
| 24 | −123.397 | (Variable) | | | 18.06 |
| 25* | 18.527 | 5.09 | 1.51633 | 64.1 | 20.72 |
| 26 | −5,421.636 | 0.52 | 1.67790 | 55.3 | 20.80 |
| 27 | 42.435 | (Variable) | | | 20.86 |
| Image surface | ∞ | | | | |

-continued

Unit mm

Aspherical surface data

Eleventh surface

K = 0.00000e+000   A4 = 2.77990e-006   A6 = 5.01516e-009
A8 = 5.35699e-011  A10 = -5.29843e-013

Twelfth surface

K = -2.15051e+000  A4 = -8.65229e-006  A6 = -1.02248e-007
A8 = 6.50805e-011

Fourteenth surface

K = -5.58052e-002  A4 = 1.57142e-005   A6 = 1.54307e-007
A8 = -5.37125e-010

Twenty-fifth surface

K = 0.00000e+000   A4 = -4.07886e-005  A6 = 9.48193e-008
A8 = -4.32267e-010 A10 = -6.16086e-014

Various data
Zoom ratio 4.71

|  | Wide angle | Intermediate | Telephoto |
|---|---|---|---|
| Focal length | 18.17 | 40.60 | 85.54 |
| F-number | 2.10 | 5.00 | 6.00 |

-continued

Unit mm

|  | Wide angle | Intermediate | Telephoto |
|---|---|---|---|
| Half angle of field (degree) | 33.01 | 18.52 | 9.03 |
| Image height | 11.80 | 13.60 | 13.60 |
| Total lens length | 99.13 | 109.10 | 119.77 |
| BF | 9.92 | 17.64 | 27.15 |
| d5 | 2.15 | 15.95 | 24.55 |
| d11 | 24.96 | 12.47 | 2.96 |
| d20 | 9.81 | 7.39 | 11.22 |
| d22 | 1.75 | 3.23 | 3.35 |
| d24 | 0.87 | 2.74 | 0.87 |
| d27 | 9.92 | 17.64 | 27.15 |
| Entrance pupil position | 34.43 | 72.69 | 112.20 |
| Exit pupil position | -15.17 | -16.39 | -16.80 |
| Front principal point position | 39.44 | 64.86 | 31.25 |
| Rear principal point position | -8.25 | -22.96 | -58.39 |

Zoom lens unit data

| Unit | First surface | Focal length | Lens structure length | Front principal point position | Rear principal point position |
|---|---|---|---|---|---|
| L1 | 1 | 71.43 | 13.97 | 1.08 | -7.91 |
| L2 | 6 | -15.21 | 11.87 | 0.89 | -8.52 |
| L3 | 12 | 22.10 | 14.83 | -0.29 | -10.24 |
| L4 | 21 | 53.92 | 2.70 | 2.33 | 0.79 |
| L5 | 23 | -24.65 | 0.70 | -0.06 | -0.46 |
| L6 | 25 | 74.08 | 5.61 | -4.35 | -7.57 |

Single lens data

| Lens | First surface | Focal length |
|---|---|---|
| 1 | 1 | -179.49 |
| 2 | 2 | 99.51 |
| 3 | 4 | 95.28 |
| 4 | 6 | -16.22 |
| 5 | 8 | -28.77 |
| 6 | 10 | 32.10 |
| 7 | 12 | 38.73 |
| 8 | 14 | 28.83 |
| 9 | 16 | -23.03 |
| 10 | 18 | 38.26 |
| 11 | 21 | 53.92 |
| 12 | 23 | -24.65 |
| 13 | 25 | 35.77 |
| 14 | 26 | -62.11 |

Values of the conditional expressions in each of Numerical Examples are provided below.

TABLE 1

|  | Conditional Expression 1 $|f12t|/f3$ | Conditional Expression 2 $|fn|/ft$ | Conditional Expression 3 $\beta kw$ | Conditional Expression 4 $f3/ft$ | Conditional Expression 5 $f3a/f3$ | Conditional Expression 6 $f1/ft$ | Conditional Expression 7 $|f2|/ft$ |
|---|---|---|---|---|---|---|---|
| Example 1 | 1.83 | 0.52 | 0.58 | 0.28 | 1.63 | 0.91 | 0.18 |
| Example 2 | 1.84 | 0.44 | 0.67 | 0.21 | 0.91 | 0.66 | 0.12 |
| Example 3 | 1.94 | 0.51 | 0.62 | 0.26 | 1.20 | 0.96 | 0.18 |
| Example 4 | 1.92 | 0.42 | 0.78 | 0.20 | 0.95 | 0.67 | 0.12 |
| Example 5 | 2.15 | 0.29 | 0.76 | 0.26 | 1.68 | 0.83 | 0.18 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-177852, filed Sep. 2, 2014, which is hereby incorporated by reference herein in its entirety.

What is claimed is:

1. A zoom lens, comprising, in order from an object side to an image side:
   a first lens unit having a positive refractive power;
   a second lens unit having a negative refractive power;
   a third lens unit having a positive refractive power;
   a middle lens group including at least one lens unit having a negative refractive power; and
   a final lens unit having a positive refractive power,
   wherein an interval between lenses included in the same lens unit is fixed during zooming,
   wherein an interval between adjacent lens units is changed during zooming,
   wherein the third lens unit includes at least two positive lenses and at least one negative lens,
   wherein the third lens unit includes an aperture stop arranged closest to the image side, and
   wherein the following conditional expressions are satisfied:

$1.50 < |f12t|/f3 < 2.20$; and $0.28 < |fn|/ft < 0.59$, where f12t represents a combined focal length of the first lens unit and the second lens unit at a telephoto end, fn represents a focal length of a lens unit (N) having a largest absolute value of the negative refractive power of the at least one lens unit forming the middle lens group, f3 represents a focal length of the third lens unit, and ft represents a focal length of the zoom lens at the telephoto end.

2. A zoom lens according to claim 1, wherein the following conditional expression is satisfied:

$0.30 < \beta kw < 0.80$, where βkw represents a lateral magnification of the final lens unit at a wide angle end.

3. A zoom lens according to claim 1, wherein the following conditional expression is satisfied:

$0.10 < f3/ft < 0.40$.

4. A zoom lens according to claim 1,
wherein the third lens unit includes as a part thereof a lens subunit (3a) arranged on the object side of a widest air interval of the third lens unit, and
wherein the following conditional expression is satisfied:

$0.80 < f3a/f3 < 2.00$, where f3a represents a focal length of the lens subunit (3a).

5. A zoom lens according to claim 1,
wherein the first lens unit includes at least one negative lens and at least one positive lens, and the first lens unit is configured to move during zooming, and
wherein the following conditional expression is satisfied:

$0.50 < f1/ft < 1.20$, where f1 represents a focal length of the first lens unit.

6. A zoom lens according to claim 1,
wherein the second lens unit includes at least one negative lens and at least one positive lens, and the second lens unit is configured to move during zooming, and
wherein the following conditional expression is satisfied:

$0.10 < |f2|/ft < 0.24$, where f2 represents a focal length of the second lens unit.

7. A zoom lens according to claim 1,
wherein the middle lens group consists of a fourth lens unit having a negative refractive power,
wherein the final lens unit consists of a fifth lens unit having a positive refractive power, and
wherein the lens units are configured to move along loci that are different from one another during zooming.

8. A zoom lens according to claim 1,
wherein the middle lens group consists of a fourth lens unit having a negative refractive power and a fifth lens unit having a negative refractive power,
wherein the final lens unit consists of a sixth lens unit having a positive refractive power, and
wherein the lens units are configured to move along loci that are different from one another during zooming.

9. A zoom lens according to claim 1,
wherein the middle lens group consists of a fourth lens unit having a positive refractive power and a fifth lens unit having a negative refractive power,
wherein the final lens unit consists of a sixth lens unit having a positive refractive power, and
wherein the lens units are configured to move along loci that are different from one another during zooming.

10. An image pickup apparatus, comprising:
a zoom lens; and
a solid-state image pickup element configured to receive light of an image formed by the zoom lens,
wherein the zoom lens comprises, in order from an object side to an image side:
a first lens unit having a positive refractive power;
a second lens unit having a negative refractive power;
a third lens unit having a positive refractive power;
a middle lens group including at least one lens unit having a negative refractive power; and
a final lens unit having a positive refractive power,
wherein an interval between lenses included in the same lens unit is fixed during zooming,
wherein an interval between adjacent lens units is changed during zooming,
wherein the third lens unit includes at least two positive lenses and at least one negative lens,
wherein the third lens unit includes an aperture stop arranged closest to the image side, and
wherein the following conditional expressions are satisfied:

$1.50 < |f12t|/f3 < 2.20$; and $0.28|fn|/ft < 0.59$, where f12t represents a combined focal length of the first lens unit and the second lens unit at a telephoto end, fn represents a focal length of a lens unit (N) having a largest absolute value of the negative refractive power of the at least one lens unit forming the middle lens group, f3 represents a focal length of the third lens unit, and ft represents a focal length of the zoom lens at the telephoto end.

\* \* \* \* \*